(12) United States Patent
Paul et al.

(10) Patent No.: US 8,416,150 B2
(45) Date of Patent: Apr. 9, 2013

(54) METHOD AND SYSTEM FOR DETERMINING A POSITION FOR AN INTERSTITAL DIFFUSER FOR USE IN A MULTI-LAYER DISPLAY

(75) Inventors: Gareth P. Paul, Mt. Eden (NZ); Robert Jaime Craig, Ellerslie (NZ); Tony Scott Simmiss, Manukau (NZ)

(73) Assignee: IGT, Reno, NV (US)

( * ) Notice: Subject to any disclaimer, the term of this patent is extended or adjusted under 35 U.S.C. 154(b) by 1265 days.

(21) Appl. No.: 12/197,182

(22) Filed: Aug. 22, 2008

(65) Prior Publication Data

US 2009/0051623 A1 Feb. 26, 2009

Related U.S. Application Data

(60) Provisional application No. 60/965,962, filed on Aug. 22, 2007.

(51) Int. Cl.
*G09G 5/00* (2006.01)
*G02B 27/22* (2006.01)

(52) U.S. Cl. .......... 345/4; 345/5; 345/6; 345/7; 359/462

(58) Field of Classification Search ............ 345/4–9; 359/462

See application file for complete search history.

(56) References Cited

U.S. PATENT DOCUMENTS

| | | | |
|---|---|---|---|
| 2,543,793 A | 3/1951 | Marks | |
| 2,961,486 A | 11/1960 | Marks | |
| 3,536,921 A | 10/1970 | Caulfield | |
| 3,605,594 A | 9/1971 | Gerritsen | |
| 3,622,224 A | 11/1971 | Wysocki et al. | |
| 3,863,246 A | 1/1975 | Trcka et al. | |
| 3,891,305 A | 6/1975 | Fader | |
| 3,918,796 A | 11/1975 | Fergason | |
| 3,940,788 A | 2/1976 | Abe et al. | |
| 3,955,208 A | 5/1976 | Wick et al. | |
| 3,992,082 A | 11/1976 | Katz | |

(Continued)

FOREIGN PATENT DOCUMENTS

| AU | 24806/00 | 7/2000 |
|---|---|---|
| AU | 24538/00 | 8/2000 |

(Continued)

OTHER PUBLICATIONS

Final Office Action Dated Oct. 19, 2009; U.S. Appl. No. 10/521,413.

(Continued)

*Primary Examiner* — Amr Awad
*Assistant Examiner* — Andre Matthews
(74) *Attorney, Agent, or Firm* — Foley & Lardner LLP

(57) ABSTRACT

A method and system for determining a position for an interstitial diffuser for use in a multi-component display is disclosed. Embodiments utilize a camera to capture images of visual output from one or more display screens of a multi-component display, where each image may be taken with an interstitial diffuser at a different position between the display screens. The images may be used to analyze the Moiré interference and blur of the visual output at each position of the diffuser. Moiré interference values for each diffuser position may be determined by processing images captured of the visual output while each display screen displays a white image. Blur values for each diffuser position may be determined by comparing images captured of the visual output with a reference image.

20 Claims, 13 Drawing Sheets

U.S. PATENT DOCUMENTS

| | | |
|---|---|---|
| 4,153,654 A | 5/1979 | Maffitt et al. |
| 4,165,922 A | 8/1979 | Morrissy |
| 4,190,856 A | 2/1980 | Ricks |
| 4,239,349 A | 12/1980 | Scheffer |
| 4,281,341 A | 7/1981 | Byatt |
| 4,294,516 A | 10/1981 | Brooks |
| 4,333,715 A | 6/1982 | Brooks |
| 4,447,141 A | 5/1984 | Eisenkraft |
| 4,448,489 A | 5/1984 | Sato et al. |
| 4,472,737 A | 9/1984 | Iwasaki |
| 4,523,848 A | 6/1985 | Gorman et al. |
| 4,541,692 A | 9/1985 | Collins et al. |
| 4,613,896 A | 9/1986 | Takita et al. |
| 4,648,691 A | 3/1987 | Oguchi et al. |
| 4,649,425 A | 3/1987 | Pund |
| 4,670,744 A | 6/1987 | Buzak |
| 4,734,295 A | 3/1988 | Liu |
| 4,736,214 A | 4/1988 | Rogers |
| 4,768,300 A | 9/1988 | Rutili |
| 4,792,850 A | 12/1988 | Liptoh et al. |
| 5,032,007 A | 7/1991 | Silverstein et al. |
| 5,046,826 A | 9/1991 | Iwamoto et al. |
| 5,046,827 A | 9/1991 | Frost et al. |
| RE33,795 E * | 1/1992 | Ogino ............... 353/74 |
| 5,086,354 A | 2/1992 | Bass et al. |
| 5,107,352 A | 4/1992 | Fergason |
| 5,112,121 A | 5/1992 | Chang et al. |
| 5,124,803 A | 6/1992 | Troxel |
| 5,132,839 A | 7/1992 | Travis |
| 5,132,878 A | 7/1992 | Carey |
| 5,261,404 A | 11/1993 | Mick et al. |
| 5,337,181 A | 8/1994 | Kelly |
| 5,367,801 A | 11/1994 | Anh |
| 5,473,344 A | 12/1995 | Bacon et al. |
| 5,537,233 A | 7/1996 | Miura et al. |
| 5,557,684 A | 9/1996 | Wang et al. |
| 5,583,674 A | 12/1996 | Mosley |
| 5,585,821 A | 12/1996 | Ishikura et al. |
| 5,589,980 A | 12/1996 | Bass et al. |
| 5,600,462 A | 2/1997 | Suzuki et al. |
| 5,689,316 A | 11/1997 | Hattori et al. |
| 5,695,346 A | 12/1997 | Sekiguchi et al. |
| 5,706,139 A | 1/1998 | Kelly |
| 5,745,197 A | 4/1998 | Leung et al. |
| 5,751,385 A | 5/1998 | Heinze |
| 5,764,317 A | 6/1998 | Sadovnik et al. |
| 5,796,455 A | 8/1998 | Mizobata et al. |
| 5,796,509 A | 8/1998 | Doany et al. |
| 5,822,021 A | 10/1998 | Johnson et al. |
| 5,825,436 A | 10/1998 | Knight |
| 5,838,308 A | 11/1998 | Knapp et al. |
| 5,924,870 A | 7/1999 | Brosh et al. |
| 5,956,180 A | 9/1999 | Bass et al. |
| 5,976,297 A | 11/1999 | Oka et al. |
| 5,990,990 A | 11/1999 | Crabtree |
| 6,005,654 A | 12/1999 | Kipfer et al. |
| 6,018,379 A | 1/2000 | Mizbota et al. |
| 6,061,110 A | 5/2000 | Hisatake et al. |
| 6,067,137 A | 5/2000 | Ohnishi et al. |
| 6,100,862 A | 8/2000 | Sullivan |
| 6,114,814 A | 9/2000 | Shannon et al. |
| 6,122,103 A | 9/2000 | Perkins et al. |
| 6,141,067 A | 10/2000 | Ikka |
| 6,147,741 A | 11/2000 | Chen et al. |
| 6,204,902 B1 | 3/2001 | Kim et al. |
| 6,239,852 B1 | 5/2001 | Oono et al. |
| 6,287,712 B1 | 9/2001 | Bulovic |
| 6,300,990 B1 | 10/2001 | Yamaguchi et al. |
| 6,326,738 B1 | 12/2001 | McAndrew |
| 6,341,439 B1 | 1/2002 | Lennerstad |
| 6,351,298 B1 | 2/2002 | Mitsui et al. |
| 6,377,306 B1 | 4/2002 | Johnson et al. |
| 6,392,725 B1 | 5/2002 | Harada et al. |
| 6,412,953 B1 | 7/2002 | Tiao et al. |
| 6,414,728 B1 | 7/2002 | Faris et al. |
| 6,443,579 B1 | 9/2002 | Myers |
| 6,489,044 B1 | 12/2002 | Chen et al. |
| 6,504,587 B1 | 1/2003 | Morishita et al. |
| 6,512,559 B1 | 1/2003 | Hashimoto et al. |
| 6,515,881 B2 | 2/2003 | Chou et al. |
| 6,557,999 B1 | 5/2003 | Shimizu |
| 6,562,440 B1 | 5/2003 | Tsuchiya et al. |
| 6,573,961 B2 | 6/2003 | Jiang et al. |
| 6,578,985 B1 | 6/2003 | Seraphim et al. |
| 6,590,605 B1 | 7/2003 | Eichenlaub |
| 6,593,904 B1 | 7/2003 | Marz et al. |
| 6,609,799 B1 | 8/2003 | Myers |
| 6,639,349 B1 | 10/2003 | Bahadur |
| 6,679,613 B2 | 1/2004 | Mabuchi |
| 6,693,692 B1 | 2/2004 | Kaneko et al. |
| 6,771,327 B2 | 8/2004 | Sekiguchi |
| 6,812,649 B2 | 11/2004 | Kim |
| 6,845,578 B1 | 1/2005 | Lucas |
| 6,897,855 B1 | 5/2005 | Matthies et al. |
| 6,906,762 B1 | 6/2005 | Witehira et al. |
| 6,947,024 B2 | 9/2005 | Lee et al. |
| 7,072,095 B2 | 7/2006 | Liang et al. |
| 7,205,355 B2 | 4/2007 | Liang et al. |
| 7,262,752 B2 | 8/2007 | Weindorf |
| 7,342,721 B2 * | 3/2008 | Lukyanitsa ............... 359/462 |
| 7,352,424 B2 | 4/2008 | Searle |
| 7,372,447 B1 | 5/2008 | Jacobsen et al. |
| 2001/0040652 A1 | 11/2001 | Hayashi |
| 2002/0027608 A1 | 3/2002 | Johnson et al. |
| 2002/0047601 A1 | 4/2002 | Shannon et al. |
| 2002/0064037 A1 | 5/2002 | Lee |
| 2002/0075211 A1 | 6/2002 | Nakamura |
| 2002/0105516 A1 | 8/2002 | Tracy |
| 2002/0111195 A1 | 8/2002 | Kweon et al. |
| 2002/0154102 A1 | 10/2002 | Huston |
| 2002/0163728 A1 | 11/2002 | Myers |
| 2002/0163729 A1 | 11/2002 | Myers |
| 2003/0043106 A1 | 3/2003 | Woo |
| 2003/0132895 A1 | 7/2003 | Berstis |
| 2003/0184665 A1 | 10/2003 | Berstis |
| 2004/0012708 A1 | 1/2004 | Matherson |
| 2004/0070565 A1 * | 4/2004 | Nayar et al. ............... 345/156 |
| 2005/0146787 A1 | 7/2005 | Lukyanitsa |
| 2006/0103951 A1 | 5/2006 | Bell et al. |

FOREIGN PATENT DOCUMENTS

| | | |
|---|---|---|
| AU | 68219/01 | 12/2001 |
| CA | 2009960 | 9/1990 |
| CA | 2020372 | 1/1991 |
| CA | 2104294 | 8/1992 |
| CA | 2345128 | 3/2000 |
| CN | 1356584 | 7/2002 |
| CN | 1369997 | 9/2002 |
| DE | 2730785 | 1/1979 |
| DE | 19757378 | 7/1998 |
| DE | 29912074 | 11/1999 |
| DE | 19920789 | 5/2000 |
| DE | 19916747 | 10/2000 |
| EP | 76651 | 4/1983 |
| EP | 0195584 | 9/1986 |
| EP | 0336351 | 10/1989 |
| EP | 0389123 | 9/1990 |
| EP | 409188 | 1/1991 |
| EP | 454423 | 10/1991 |
| EP | 0573433 | 12/1993 |
| EP | 595387 | 4/1994 |
| EP | 0802684 | 10/1997 |
| EP | 0999088 | 5/2000 |
| EP | 1046944 | 10/2000 |
| EP | 1081774 | 3/2001 |
| EP | 1093008 | 4/2001 |
| EP | 1116070 | 7/2001 |
| EP | 2000/0733927 | 11/2001 |
| EP | 1151430 | 11/2001 |
| EP | 1155351 | 11/2001 |
| EP | 1231757 | 8/2002 |
| EP | 1271944 | 1/2003 |
| EP | 1287401 | 3/2003 |
| EP | 1923860 | 5/2008 |
| GB | 1448520 | 9/1976 |
| GB | 2107482 | 4/1983 |
| GB | 2312584 | 10/1997 |

| | | |
|---|---|---|
| GB | 2314943 | 1/1998 |
| GB | 2347003 | 8/2000 |
| GB | 2372618 | 8/2002 |
| IL | 93472 | 11/1994 |
| JP | 56-007916 | 1/1981 |
| JP | 57-119389 | 7/1982 |
| JP | 60-024502 | 2/1985 |
| JP | 60-103895 | 6/1985 |
| JP | 60-122920 | 7/1985 |
| JP | 60-211830 | 10/1985 |
| JP | 60-233684 | 11/1985 |
| JP | 60-244924 | 12/1985 |
| JP | 61-166524 | 7/1986 |
| JP | 61-200783 | 9/1986 |
| JP | 62-122494 | 6/1987 |
| JP | 62-161294 | 7/1987 |
| JP | 62-191819 | 8/1987 |
| JP | 62-191820 | 8/1987 |
| JP | 62-235929 | 10/1987 |
| JP | 63-039299 | 2/1988 |
| JP | 63-067094 | 3/1988 |
| JP | 63-100898 | 5/1988 |
| JP | 63-203088 | 8/1988 |
| JP | 63-274918 | 11/1988 |
| JP | 63-318856 | 12/1988 |
| JP | 2-262119 | 10/1990 |
| JP | 3-002835 | 1/1991 |
| JP | 3-021902 | 1/1991 |
| JP | 3-101581 | 4/1991 |
| JP | 3-148622 | 6/1991 |
| JP | 3-174580 | 7/1991 |
| JP | 3-226095 | 10/1991 |
| JP | 3-233548 | 10/1991 |
| JP | 4-034521 | 2/1992 |
| JP | 4-034595 | 2/1992 |
| JP | 04-107540 | 4/1992 |
| JP | 4-191755 | 7/1992 |
| JP | 5-007373 | 1/1993 |
| JP | 5-091545 | 4/1993 |
| JP | 5-142515 | 6/1993 |
| JP | 6-233328 | 8/1994 |
| JP | 7006827 | 1/1995 |
| JP | 7-146473 | 6/1995 |
| JP | 7-198921 | 8/1995 |
| JP | 7-198942 | 8/1995 |
| JP | 7-209573 | 8/1995 |
| JP | 7-222202 | 8/1995 |
| JP | 8-036375 | 2/1996 |
| JP | 8-076139 | 3/1996 |
| JP | 8-335043 | 12/1996 |
| JP | 9-033858 | 2/1997 |
| JP | 9-043540 | 2/1997 |
| JP | 9-096789 | 4/1997 |
| JP | 9-102969 | 4/1997 |
| JP | 9-133893 | 5/1997 |
| JP | 9-211392 | 8/1997 |
| JP | 9-282357 | 10/1997 |
| JP | 9-308769 | 12/1997 |
| JP | 10-003355 | 1/1998 |
| JP | 10-039821 | 2/1998 |
| JP | 10-105829 | 4/1998 |
| JP | 10-228347 | 8/1998 |
| JP | 10-232304 | 9/1998 |
| JP | 10-312033 | 11/1998 |
| JP | 11-066306 | 3/1999 |
| JP | 11-205822 | 7/1999 |
| JP | 11202793 | 7/1999 |
| JP | 2000-075135 | 3/2000 |
| JP | 2000-111940 | 4/2000 |
| JP | 2000-113988 | 4/2000 |
| JP | 2000-142173 | 5/2000 |
| JP | 2001-056410 | 2/2001 |
| JP | 2001-215332 | 8/2001 |
| JP | 2002014772 | 1/2002 |
| JP | 2002504764 | 2/2002 |
| JP | 2002-097269 | 4/2002 |
| JP | 2002-099223 | 4/2002 |
| JP | 2002-156608 | 5/2002 |
| JP | 200142310 | 8/2002 |
| JP | 2002-258284 | 9/2002 |
| JP | 2002-287144 | 10/2002 |
| JP | 2002-350772 | 12/2002 |
| JP | 2003-015555 | 1/2003 |
| NO | 20005178 | 4/2001 |
| PL | 343229 | 4/2001 |
| WO | 91/12554 | 8/1991 |
| WO | 91/15930 | 10/1991 |
| WO | 92/09003 | 5/1992 |
| WO | 92/15170 | 9/1992 |
| WO | 96/27992 | 9/1996 |
| WO | 97/14987 | 4/1997 |
| WO | 98/04087 | 1/1998 |
| WO | 98/16869 | 4/1998 |
| WO | 98/47106 | 10/1998 |
| WO | 99/42889 | 8/1999 |
| WO | 99/44095 | 9/1999 |
| WO | 00/17708 | 3/2000 |
| WO | 00/36578 | 6/2000 |
| WO | 00/48167 | 8/2000 |
| WO | 00/49453 | 8/2000 |
| WO | 01/15128 | 3/2001 |
| WO | 01/95019 | 12/2001 |
| WO | 02/35277 | 5/2002 |
| WO | 02/091033 | 11/2002 |
| WO | 03/003109 | 1/2003 |
| ZA | 9703025 | 11/1997 |

OTHER PUBLICATIONS

Non-Final Office Action Dated Dec. 28, 2009; U.S. Appl. No. 12/046,265.
Final Office Action Mailed Jul. 9, 2010; U.S. Appl. No. 12/046,265.
Final Office Action Mailed Aug. 30, 2010; U.S. Appl. No. 10/521,413.
Final Office Action Mailed Oct. 8, 2010; U.S. Appl. No. 10/492,624.
"Kodak Datashow HR/M Projection Pad", Motion Picture & Audio-visual Products, Eastman Kodak Co., 1988.
"Teamworkstation 1989-1994," http://web.media.mit.edu/~ishii/TWS.html.
"Textarc: An Alternate Way to View a Text," http://textarc.org.
"Textarc: NYSCA Grant and Public Installation," http"//textarc.org.
"Textarc: The Print and the Artist," http://textarc.org.
Alampiev et al., "Technology of the Three Dimensional Electronic Matrix for Liquid Crystal Display" Jan. 1, 1976.
Blundell et al., "Volumetric Three-Deminsional Display Systems", pp. 1-7.
Buzak, "CRT Displays Full-color 3-D Images".
Clearboard 1991-1994, http://web.media.mit.edu/~ishii/CB.html.
Cole et al., "A Three-Dimensional Display for Radar Returns", pp. 52-53.
Courter et al., Microsoft Office 2000 Professional Edition, 1999, Sybex Inc., pp. xxxi, 543, 685.
General Electric, "3-D Liquid Crystal Display for Mine Detecting Radar" Apr. 1, 1974.
Harrison et al., "Transparent Layered User Interfaces: An Evaluation of a Display Design to Enhance Focused and Divided Attention" ACM, 13 pages, 1995.
Hattori, T. et. Al. "Spatial Modulation Display Using Spatial Light Modulators", Optical Engineering, vol. 31, No. 2, pp. 350-352, (Feb. 1992).
Technical Report of the Institute of Television Engineers of Japan, vol. 20, No. 5, Feb. 1996.
Ishii et al., "Iterative Design of Seamless Collaboration Media", Communications of the ACM, Aug. 1994, vol. 37, pp. 83-97.
L.F. Hodges et al., "True Three-Demensional CRT-Based Displays," Infor. Display, pp. 18-22 (May 1987).
Tamura et al., "Multilayer 3-D Display Adapter", Applied Optics, vol. 17, No. 23, pp. 3695-3696 (Dec. 1, 1978).
Office Action U.S. Appl. No. 11/402,847 Mail Date Nov. 16, 2006.
Office Action U.S. Appl. No. 10/416,885 Mail Date Jun. 15, 2006.
Office Action U.S. Appl. No. 10/416,885 Mail Date Nov. 2, 2005.
Office Action U.S. Appl. No. 10/475,432 Mail Date Feb. 1, 2006.
Office Action U.S. Appl. No. 10/475,432 Mail Date Feb. 26, 2007.
Office Action U.S. Appl. No. 10/475,432 Mail Date Jul. 28, 2006.

Office Action U.S. Appl. No. 10/475,432 Mail Date Aug. 28, 2008.
Office Action U.S. Appl. No. 10/475,432 Mail Date Sep. 27, 2005.
Office Action U.S. Appl. No. 10/475,432 Mail Date Oct. 5, 2007.
Office Action U.S. Appl. No. 10/475,432 Mail Date Dec. 20, 2007.
Office Action U.S. Appl. No. 10/492,624 Mail Date Jan. 5, 2009.
Office Action U.S. Appl. No. 10/492,624 Mail Date Aug. 1, 2007.
Office Action U.S. Appl. No. 10/508,726 Mail Date May 1, 2008.
Office Action U.S. Appl. No. 10/508,726 Mail Date Jun. 1, 2007.
Office Action U.S. Appl. No. 10/508,726 Mail Date Sep. 21, 2007.
Office Action U.S. Appl. No. 10/508,726 Mail Date Dec. 11, 2006.
Office Action U.S. Appl. No. 10/528,334 Mail Date Feb. 24, 2009.
Office Action U.S. Appl. No. 10/528,334 Mail Date Aug. 5, 2008.
Office Action U.S. Appl. No. 11/402,847 Mail Date Jan. 14, 2008.
Office Action U.S. Appl. No. 11/402,847 Mail Date Jun. 4, 2007.
Office Action U.S. Appl. No. 11/402,847 Mail Date Sep. 12, 2007.
Final Office Action Dated Feb. 5, 2010; U.S. Appl. No. 10/492,624.
Non Final OA Dated Jan. 5, 2009; U.S. Appl. No. 10/492,624.
Final OA Dated Feb. 24, 2009; U.S. Appl. No. 10/582,334.
Non Final Dated Apr. 29, 2009; U.S. Appl. No. 10/521,413.
Non Final OA Dated Apr. 14, 2009; U.S. Appl. No. 10/475,432.
Non-Final Office Action Dated Apr. 29, 2010; U.S. Appl. No. 10/521,413.
Non-Final Office Action Dated Jun. 22, 2009; U.S. Appl. No. 10/492,624.
Non-Final Office Action Dated Sep. 1, 2009; U.S. Appl. No. 10/528,334.

* cited by examiner

METHOD AND SYSTEM FOR DETERMINING A POSITION FOR AN INTERSTITAL DIFFUSER FOR USE IN A MULTI-LAYER DISPLAY

RELATED APPLICATIONS

The present application claims the benefit of U.S. Provisional Patent Application No. 60/965,962, filed Aug. 22, 2007, entitled "MOIRÉ IN FOURIER DOMAIN," naming Gareth P. Bell, Robert Craig and Tony Simmiss as inventorsl That application is incorporated herein by reference in its entirety and for all purposes.

BACKGROUND OF THE INVENTION

Multi-component displays ("multi-layer displays) generally include multiple display screens in a stacked arrangement. Each display screen can display images, thereby providing visual depth and other visual effects that a single display screen cannot. However, stacking display screens often produces Moiré interference characterized by banding or repeated patterns in the visual output of the multi-component display. More specifically, the Moiré interference is caused by overlaying of similar patterns of the color filters and the active matrix structures of each display screen which covers the traces, leads and transistors allocated to each pixel.

Diffusers are commonly placed between display screens of a multi-component display to reduce the Moiré interference. The distance between the rear display screen and the diffuser, as well as the scattering properties of the diffuser itself, can be varied to reduce Moiré interference. Accordingly, diffusers can enhance the visual output of a multi-component display.

Although diffusers are capable of reducing Moiré interference, they can blur images displayed on a rear display screen of the multi-component display. Thus, the position of the diffuser with respect to the rear display screen of the multi-component display is important for reducing Moiré interference without introducing an unacceptable amount of blur to the visual output of the multi-component displays.

Conventional approaches to managing the tradeoff between Moiré interference and blur in the visual output of the multi-component display involve manually adjusting the position of the diffuser with respect to the rear display while observing the change in Moiré interference and blur of the visual output. However, the ability of the human eye to detect small changes in Moiré interference and blur is limited and subjective. Accordingly, conventional approaches often result in imprecise positioning of the diffuser with respect to the rear display screen, thereby introducing unacceptable Moiré interference and/or blur in the visual output of the multi-component display.

SUMMARY OF THE INVENTION

Accordingly, a need exists for a precise way to position a diffuser between display screens of a multi-component display. Additionally, a need exists for a method and system for selecting a position for a diffuser which reduces Moiré interference and blur in the visual output of a multi-component display to acceptable levels. Embodiments of the present invention provide novel solutions to these needs and others as described below.

Embodiments of the present invention are directed to a method and system for determining a position for an interstitial diffuser for use in a multi-component display. More specifically, embodiments utilize a camera to capture images of visual output from one or more display screens of a multi-component display, where each image may be taken with an interstitial diffuser at a different position between the display screens. The images may be used to analyze the Moiré interference and blur of the visual output at each position of the diffuser. For example, Moiré interference values for each diffuser position may be determined by processing images captured of the visual output while each display screen displays a white image. Blur values for each diffuser position may be determined by comparing images captured of the visual output with a reference image. The reference image may be generated by capturing an image of the visual output of a first display screen of the multi-component display while the interstitial diffuser and a second display screen (e.g., overlapping the first display screen) is removed from the field of view of the camera. Additionally, the system used to determine the Moiré interference values and the blur values may be calibrated by comparing the Moiré interference values and/or the blur values to theoretical Moiré interference values and/or theoretical blur values.

In one embodiment, a method of determining a position for an interstitial diffuser for a multi-component display includes positioning the interstitial diffuser at a plurality of positions between a first display screen and a second display screen, wherein the second display screen overlaps the first display screen. Images of visual output from the first display screen and the second display screen are captured at each of the plurality of positions. The method also includes determining, based on the images, a respective visual interference value and a respective blur value associated with the visual output at each of the plurality of positions of the interstitial diffuser. A position is selected from the plurality of positions based on a visual interference value and a blur value associated therewith. The method may also include displaying white images on the first and second display screens, wherein the capturing images of the visual output further comprises capturing images of a Moiré interference pattern caused by display of the white images on the first and second display screens, and wherein the determining a visual interference value further comprises determining a Moiré interference value based on the images of the Moiré interference patterns captured. In one embodiment, the method may include removing the interstitial diffuser and the second display screen from a field of view of a camera, capturing a reference image of visual output from the first display screen with the interstitial diffuser and the second displays screen removed from the field of view, and wherein the determining the blur value further comprises generating the blur value based on comparison of the images with the reference image.

In another embodiment, a system includes means for positioning the interstitial diffuser at a plurality of positions between a first display screen and a second display screen, wherein the second display screen overlaps the first display screen. The system may also include means for capturing images of visual output from the first display screen and the second display screen, using a camera, at each of the plurality of positions. The system also includes means for determining, based on the images, a respective Moiré interference value and a respective blur value associated with the visual output at each of the plurality of positions of the interstitial diffuser, and further includes means for selecting a position from the plurality of positions based on a Moiré interference value and a blur value associated with the position.

In yet another embodiment, a system includes a first display screen including a plurality of pixels, the first display screen operable to display a first image. A second display screen includes a second plurality of pixels, the second display screen operable to display a second image, wherein the second display screen overlaps the first display screen. A diffuser is operable to be positioned at a plurality of positions between the first and second display screens. A device is operable to capture images of visual output of the first and second display screens. The system also includes a computer system coupled to the device and for determining, based on the images, a respective visual interference value and a respective blur value associated with the visual output at each of the plurality of positions of the interstitial diffuser, the computer system further for selecting a position from the plurality of positions based on a visual interference value and a blur value associated with the position.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
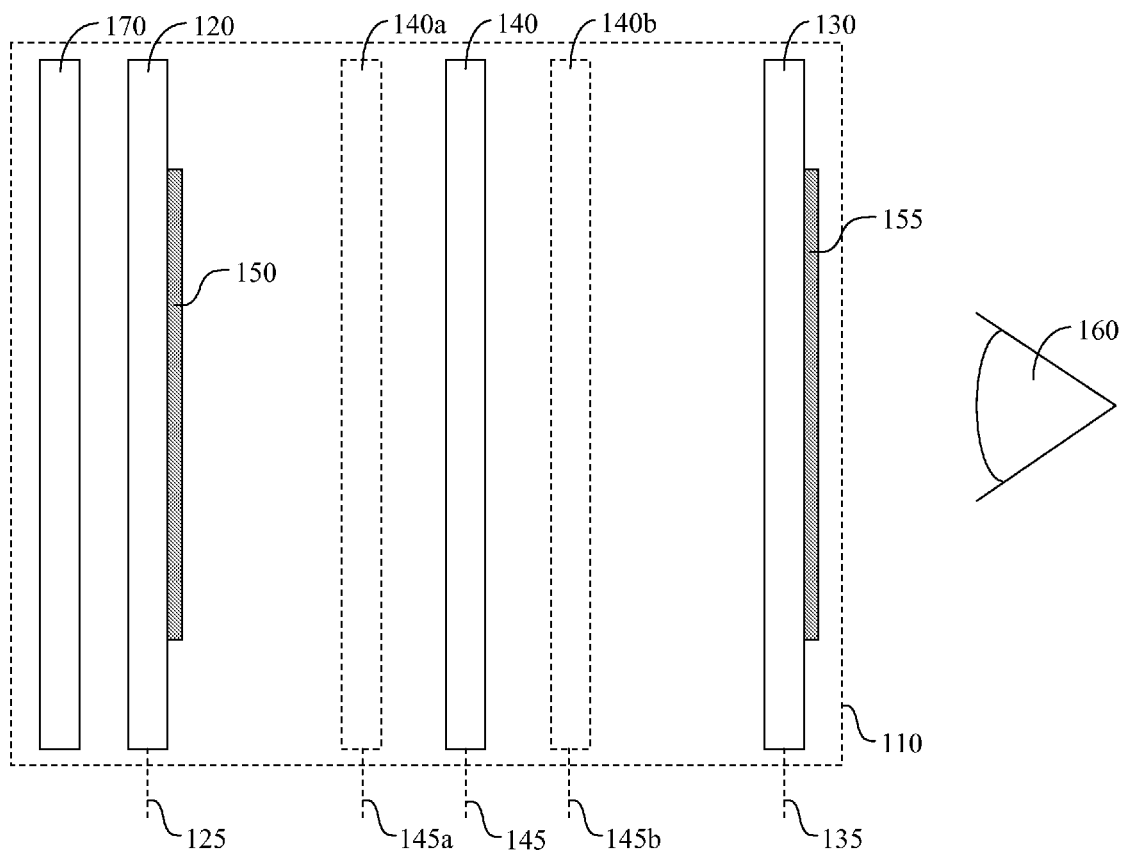
FIG. 1 shows a diagram of an exemplary multi-component display in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "delivering," "depicting," "detecting," "determining," "displaying," "establishing," "executing," "filtering," "flipping," "generating," "grouping," "hiding," "identifying," "initiating," "interacting," "modifying," "monitoring," "moving," "outputting," "performing," "placing," "positioning," "presenting," "processing," "programming," "querying," "removing," "repeating," "resuming," "sampling," "selecting," "simulating," "sorting," "storing," "subtracting," "suspending," "tracking," "transcoding," "transforming," "transferring," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows diagram 100 of an exemplary multi-component display in accordance with one embodiment of the present invention. As shown in FIG. 1, multi-component display (MCD) 110 includes rear display screen 120, front display screen 130 and optical component 140 disposed between display screens 120 and 130. The visual output from MDC 110 may include images or graphical objects 150 displayed on rear display screen 120 and/or images or graphical objects 155 displayed on front display screen 130. Observer 160 may observe the visual output from MCD 110, and may include a human eye, an electrical and/or mechanical optical reception component (e.g., a still-image camera, moving-image camera, etc.), etc. It should be appreciated that optical component 140 and/or front display screen 130 may be semi-transparent and transmit sufficient light, in one embodiment, to enable viewing of graphical objects 150 by observer 160.

Graphical objects 150 may include any visual display of rear display screen 120, where graphical objects 155 may include any visual display of front display screen 130. In one embodiment, the graphical objects (e.g., 150 and/or 155) may comprise still images. The still images may comprise stand-alone images, or alternatively, frames of a video or other moving imagery. Alternatively, the graphical objects (e.g., 150 and/or 155) may comprise frame-less moving imagery. Additionally, the graphical objects (e.g., 150 and/or 155) may comprise multiple distinct images, contiguous portions of the same image, non-contiguous portions of the same image, etc.

As shown in FIG. 1, display screens 120 and/or 130 may comprise a liquid crystal display (LCD) with an active matrix of pixels and/or subpixels capable of discriminating light (e.g., output by backlight 170 disposed behind display screen 120) to render an image. Alternatively, display screens 120 and/or 130 may comprise organic light emitting diode (OLED) displays, transparent light emitting diode (TOLED) displays, cathode ray tube (CRT) displays, field emission displays (FEDs), field sequential display or projection displays. And in other embodiments, display screens 120 and/or 130 may comprise other display technologies.

Backlight 170 may include an array of cold cathode fluorescent lamps (CCFLs) in one embodiment. Alternatively, backlight 170 may include light emitting diodes (LEDs) or other devices capable of outputting light.

Interstitial layers (e.g., optical component 140) may be disposed between display screens 120 and 130 for altering the display of graphical objects on the MCD (e.g., 110) and/or attributes of the MCD (e.g., 110) itself. For example, optical component 140 may comprise a diffuser (e.g., holographic diffuser, optical component having a Gaussian profile, etc.), a filter (e.g., a spatial filter, etc.), a polarizer, a lens, a touchscreen, or a combination thereof. Alternatively, optical component 140 may comprise a micro-optical structure. Thus, the type and/or characteristics of component 140 may be varied to change how graphical objects (e.g., 150) are displayed on MCD 110. For example, optical component 140 may affect Moiré interference, sharpness or blurriness, tonal balance, color balance, etc., associated with MCD 110 and/or the display of graphical objects (e.g., 150) on MCD 110.

The display of graphical objects on MCD 110 may be adjusted (e.g., in addition to or in place of varying attributes of optical component 140) by varying the position of optical component 140 with respect to rear display screen 120 and/or front display screen 130. As shown in FIG. 1, rear display screen 120 is located at position 125, front display screen is located at position 135, and optical component 140 is located at position 145. Optical component 140 may be shifted toward either rear display screen 120 (e.g., as indicated by optical component outline 140a at position 145a) or front display screen 130 (e.g., as indicated by optical component outline 140b at position 145b) to affect Moiré interference, sharpness or blurriness, tonal balance, color balance, etc., associated with MCD 110 and/or the display of graphical objects (e.g., 150) on MCD 110.

Accordingly, embodiments can be used to improve the visual output (e.g., the visual quality thereof) of an MCD (e.g., 110). For example, where optical component 140 comprises a diffuser, a position of optical component 140 (e.g., between display screens 120 and 130) may be determined which reduces Moiré interference (e.g., in the vertical and/or horizontal directions) and/or blur in the visual output of the MCD (e.g., 110). Further, in one embodiment, a position of optical component 140 may be selected from among a plurality of positions between display screens 120 and 130, where the selected position may be associated with a Moiré interference (e.g., in the visual output of the MCD) below a threshold value and also associated with the lowest blur (e.g., of the visual output of the MCD) of the plurality of positions.

Although FIG. 1 shows optical component 140 disposed between the front and rear display screens (e.g., 120 and 130), it should be appreciated that optical component 140 may be alternatively positioned (e.g., disposed in front of front display screen 130) in other embodiments. Additionally, although FIG. 1 shows only one optical component (e.g., 140), it should be appreciated that MCD 110 may comprise more than one optical component in other embodiments, where each optical component may be placed in front of or behind display screen 120 and/or display screen 130.

Although FIG. 1 shows backlight 170 disposed behind display screen 120, it should be appreciated that backlight 170 may be alternatively positioned with respect to display screens 120 and 130 in other embodiments. For example, backlight 170 may be positioned between display screens 120 and 130, where a reflector positioned behind display screen 120 may reflect light through display screen 120 and illuminate images or graphical objects 150. Further, it should be appreciated that MCD 100 may include more than one backlight in other embodiments.

Additionally, although FIG. 1 shows two display screens (e.g., 120 and 130), it should be appreciated that MCD 110 may comprise a larger or smaller number of display screens in other embodiments, where any additional display screens may be positioned behind, between or in front of (or any combination thereof) the MCD components (e.g., display screen 120, display screen 130, optical component 140, etc.) depicted in FIG. 1. Further, it should be appreciated that the elements (e.g., 110-160) depicted in FIG. 1 are not drawn to scale, and thus, may comprise different shapes, sizes, etc. in other embodiments.

Figure 2A:
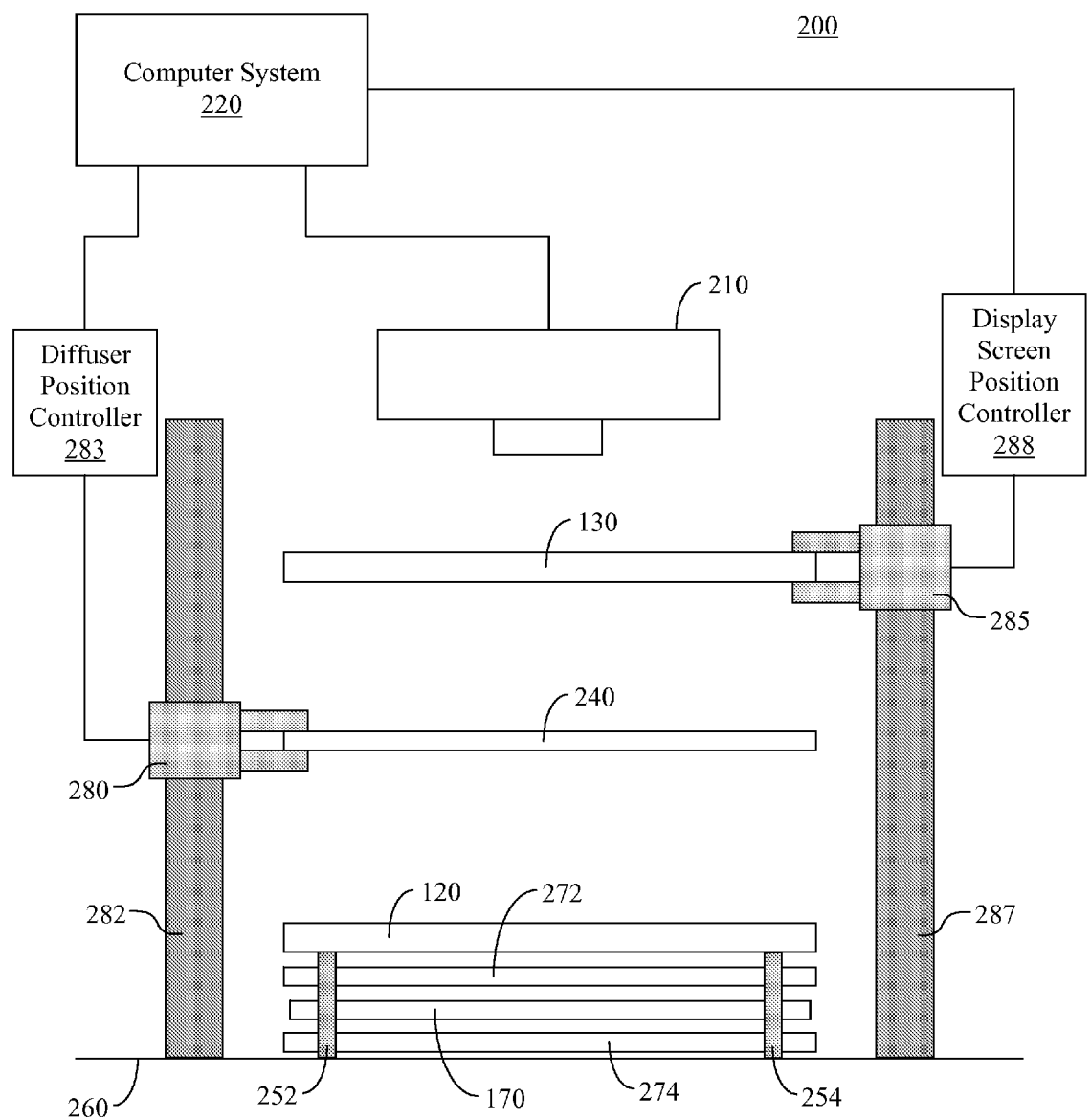
FIG. 2A shows an exemplary system for determining a position of an interstitial diffuser of a multi-component display in accordance with one embodiment of the present invention.

FIG. 2A shows exemplary system 200 for determining a position of an interstitial diffuser of a multi-component display in accordance with one embodiment of the present invention. As shown in FIG. 2A, display screen 130 overlaps display screen 120 and interstitial diffuser 240 such that light from backlight 170 can travel through the MCD components (e.g., display screen 120, diffuser 240 and display screen 130) and produce a visual output. Camera 210 can capture a plurality of images of the visual output, where each image may be taken with interstitial diffuser 240 at a different position between the display screens (e.g., 120 and 130). The images (e.g., captured using camera 210) may be communicated to computer system 220 and used to analyze the Moiré interference and blur of the visual output at each position of diffuser 240. In this manner, embodiments enable automated determination of a position for diffuser 240 (e.g., with respect to display screen 120) with reduced Moiré interference and blur in the visual output of the MCD components, where the position determined by system 200 is based on quantified values (e.g., as opposed to human observation alone) of Moiré interference in the visual output (e.g., as determined in accordance with process 400 of FIGS. 4A and 4B) and blur in the visual output (e.g., as determined in accordance with process 800 of FIG. 8).

Features 252 and 254 are used to secure display screen 120 and/or other MCD components (e.g., backlight 170, backlight diffuser 272, reflector 274, etc.) to surface 260. In one embodiment, display screen 120 and/or other MCD components may be held by features 252 and 254 in a substantially parallel orientation with respect to surface 260. Features 252 and 254 may include posts, racks, some combination thereof, etc. In this manner, light from backlight 170 can be transmitted through display screen 120 and/or other MCD components (e.g., diffuser 240, display screen 130, etc.) for generating the visual output.

Backlight 170 may be used in system 200 without backlight diffuser 272 and/or reflector 274 in one embodiment. Alternatively, backlight diffuser 272 may be used to diffuse the light output by backlight 170, thereby improving the visual output. Additionally, reflector 274 may be used with backlight 170 and/or backlight diffuser 272 to reflect light output by backlight 170 (e.g., away from display screen 120) and redirect this light toward display screen 120, thereby increasing the overall light output by backlight 170 in one embodiment.

As shown in FIG. 2A, positioning mechanism 280 may be used to position diffuser 240, while positioning mechanism 285 may be used to position display 130. For example, diffuser 240 may attach to positioning mechanism 280 which moves vertically along member 282 (e.g., in response to manual articulation of positioning mechanism 280 by a user, in response to automatic articulation of positioning mechanism 280 by diffuser position controller 283 and/or computer system 220, etc.), whereas display screen 130 may attach to positioning mechanism 285 which moves vertically along member 287 (e.g., in response to manual articulation of positioning mechanism 285 by a user, in response to automatic articulation of positioning mechanism 285 by display screen position controller 288 and/or computer system 220, etc.).

Figure 2B:
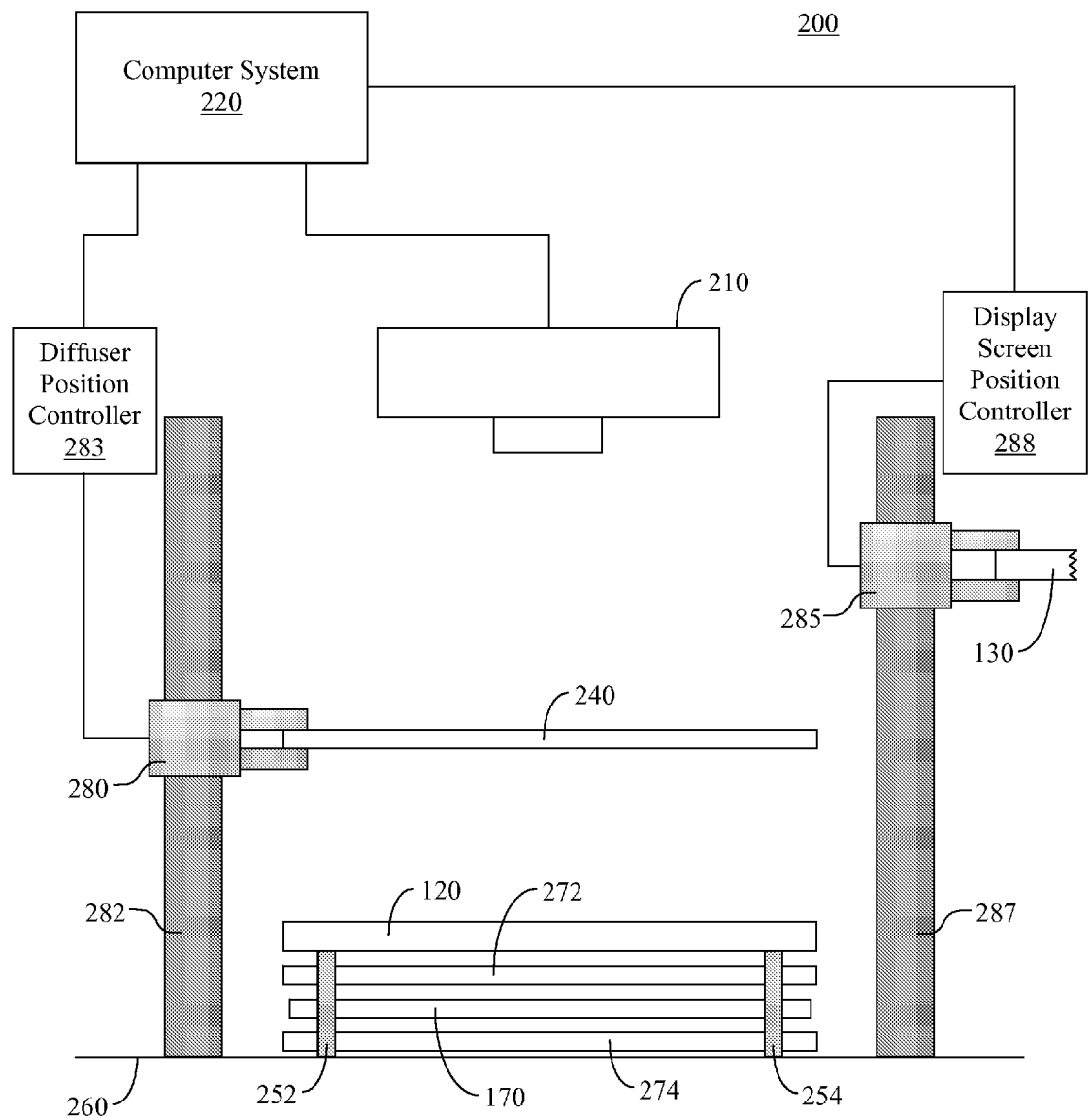
FIG. 2B shows an exemplary system for capturing images for use in determining blur values in accordance with one embodiment of the present invention.
Figure 2C:
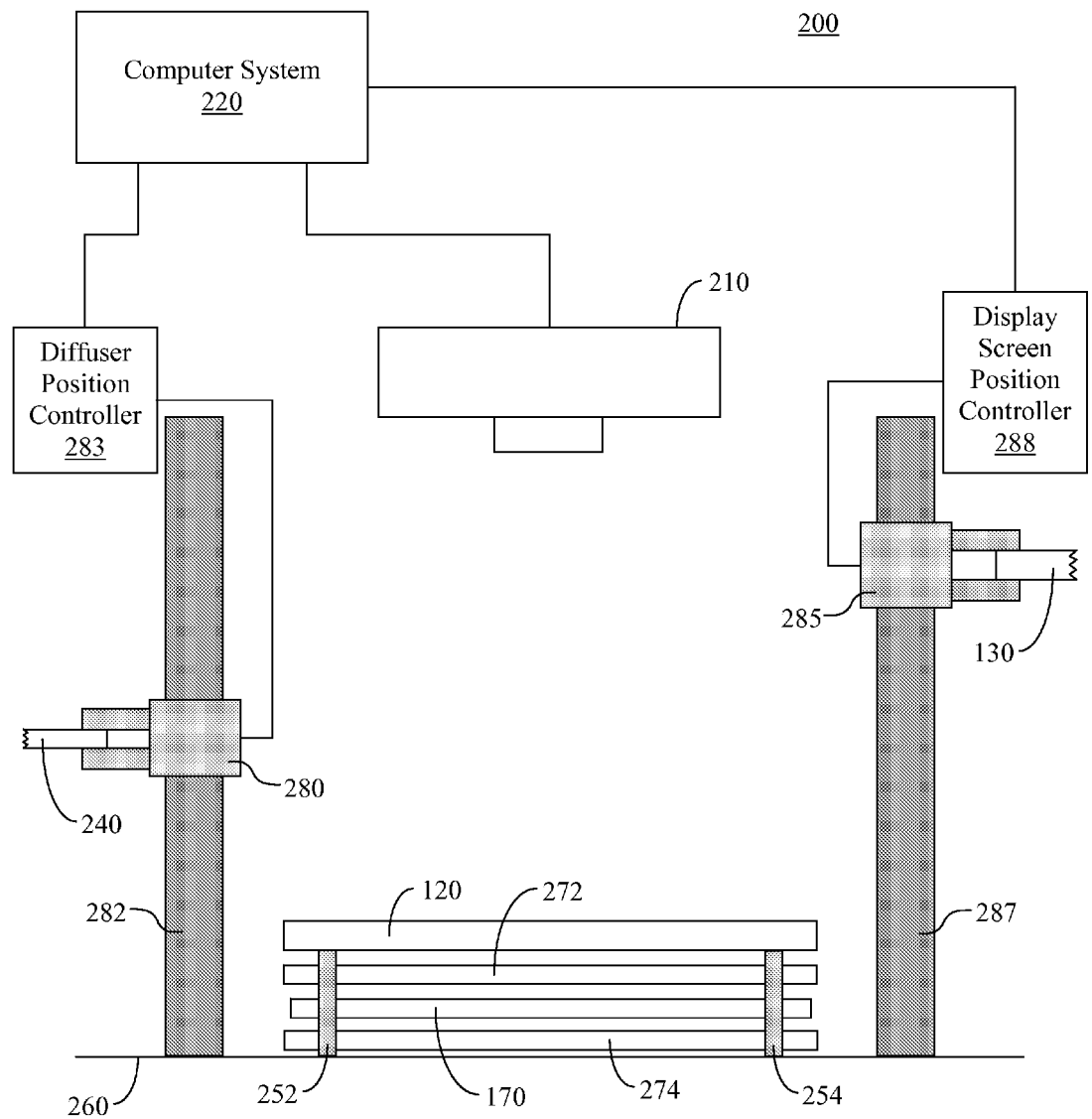
FIG. 2C shows an exemplary system for capturing a reference image for use in determining blur values in accordance with one embodiment of the present invention.

Positioning mechanisms 280 and 285 may also rotate about their respective members (e.g., 282 and 287), thereby enabling diffuser 240 and/or display screen 130 to be moved out of the way or removed from the field of view of camera 210. For example, as shown in FIG. 2B, display screen 130 may be moved out of the way or removed from the field of view of camera 210 (e.g., during capture of images for analyzing blur in the visual output). As another example, as shown in FIG. 2C, diffuser 240 may be moved out of the way or removed from the field of view of camera 210 (e.g., during capture of a reference image for analyzing blur in the visual output). Although FIG. 2C shows display screen 130 removed from the field of view of camera 210, it should be appreciated that display screen 130 may remain in the field of view of camera 210 (e.g., as shown in FIG. 2A) while diffuser 240 is removed from the field of view of camera 210 in one embodiment. And in other embodiments, display screen 130 and/or diffuser 240 may be removed from the field of view of camera 210 by detaching one or more of the components from its respective positioning mechanism.

As shown in FIG. 2A, positioning mechanism 280 and/or 285 may include a threaded member for engaging threads of its corresponding member (e.g., 282 and 287). As such, the threaded member of the positioning mechanism (e.g., 280 and 285) may be rotated (e.g., manually by a user, automatically by a motor controlled by controller 283 or controller 288, etc.) to move the positioning mechanism vertically on the corresponding member (e.g., 282 and 287), thereby changing the position of the component (e.g., display screen 130, diffuser 240, etc.) attached to the positioning mechanism. Alternatively, positioning mechanisms 280 and 285 may be moved vertically along their corresponding members (e.g., 282 and 287) by fluid (e.g., air, oil, etc.) force, by a mechanism other than threads, etc.

In one embodiment, diffuser 240 may be moved to a plurality of discrete positions between display screens 120 and 130, where camera 210 may capture an image at each of the discrete positions. Alternatively, diffuser 240 may be moved continuously between display screens 120 and 130 while camera 210 captures images (e.g., still images, framed video, video without frames, etc.).

Figure 3A:
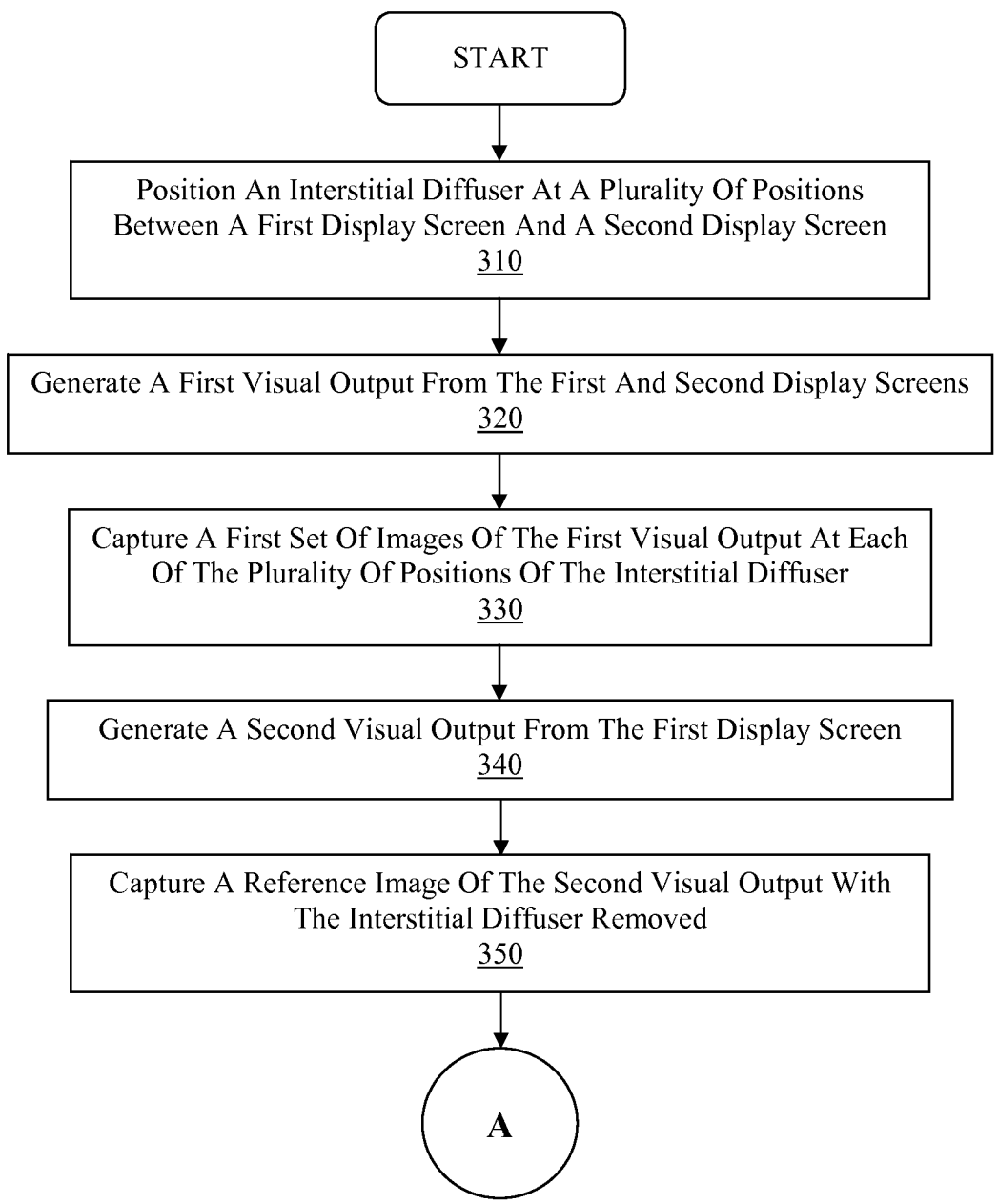
FIG. 3A shows a flowchart of a first portion of an exemplary computer-implemented process for determining a position of an interstitial diffuser for a multi-component display in accordance with one embodiment of the present invention.
Figure 3B:
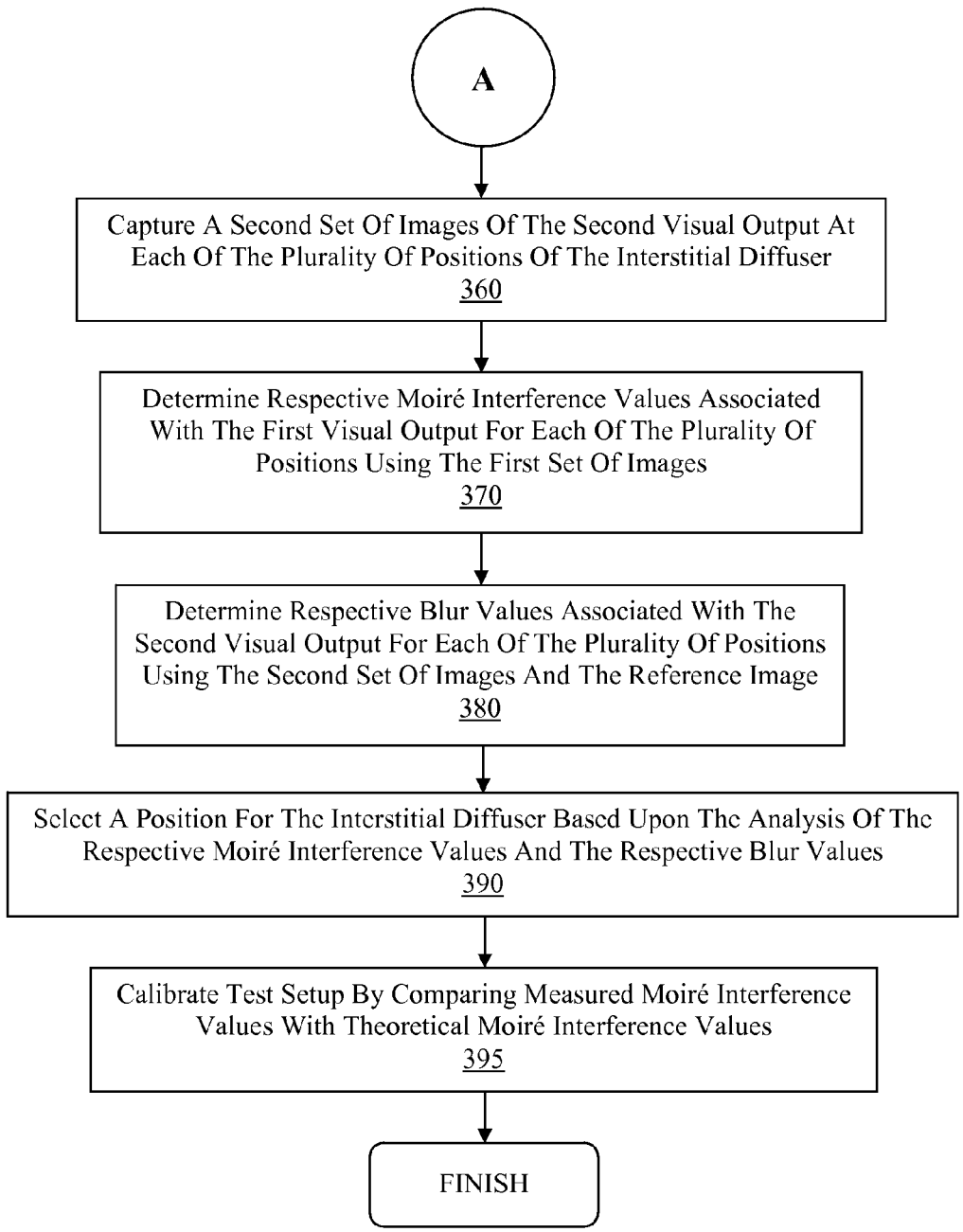
FIG. 3B shows a flowchart of a second portion of an exemplary computer-implemented process for determining a position of an interstitial diffuser for a multi-component display in accordance with one embodiment of the present invention.

FIGS. 3A and 3B show a flowchart of exemplary computer-implemented process 300 for determining a position of an interstitial diffuser for a multi-component display in accordance with one embodiment of the present invention. As shown in FIG. 3A, step 310 involves positioning an interstitial diffuser (e.g., 240) at a plurality of positions between a first display screen (e.g., 120) and a second display screen (e.g., 130). The diffuser may be moved continuously through each of the positions. Alternatively, the diffuser may be moved to and held at each of the positions (e.g., for a predetermined period of time). Additionally, movement of the diffuser (e.g., 240) in step 310 may be performed by a positioning mechanism (e.g., 280), where the positioning mechanism is manually adjusted (e.g., by turning a threaded member, etc.) and/or automatically adjusted (e.g., by a controller and/or computer system as shown in FIGS. 2A, 2B and 2C) to change the position of the diffuser.

Step 320 involves generating a first visual output from the first and second display screens. For example, a separate video signal may be sent to each of the first and second display screens (e.g., 120 and 130) causing the first and second display screens to display respective images or graphical objects (e.g., 150 and 155). The respective images or graphical objects may be displayed simultaneously for viewing by an observer (e.g., 160), thereby forming the first visual output of the first and second display screens. Additionally, the first visual output may include a Moiré interference pattern which may be captured or recorded by a camera (e.g., 210), and thus, each of the images displayed by the first and second display screens may be any images or graphical objects capable of creating the Moiré interference pattern. In one embodiment, the first and second display screens may each display a respective white image.

As shown in FIG. 3A, step 330 involves capturing a first set of images of the first visual output at each of the plurality of positions of the interstitial diffuser. The images may be captured by a camera (e.g., 210), where the camera may capture or record still images, video frames, frame-less video, etc. In one embodiment, more than one image may be captured for each of the positions of the interstitial diffuser (e.g., 240). Additionally, each image of the first set of images may depict or otherwise include data associated with a Moiré interference pattern in the first visual output of the first and second display screens.

Step 340 involves generating a second visual output from the first display screen. For example, a video signal may be sent to the first display screen (e.g., 120) for displaying an image used to analyze the blur of the second visual output caused by an overlapping diffuser (e.g., 240). The image displayed by the first display screen may include a random image (e.g., random colors, random grayscale values, etc.) in one embodiment. Alternatively, the image may include a pattern. And in one embodiment, the image may include a graphical object with at least one straight edge (e.g., a line, a square, a triangle, another polygon, etc.).

As shown in FIG. 3A, step 350 involves capturing a reference image of the second visual output with the interstitial diffuser removed. For example, as shown in FIG. 2C, the interstitial diffuser (e.g., 240) may be moved out of the way or removed from the field of view of the camera (e.g., 210). In this manner, a reference image may be captured by the camera (e.g., 210) without blur introduced by the interstitial diffuser (e.g., 240).

As shown in FIG. 3B, step 360 involves capturing a second set of images of the second visual output at each of the plurality of positions of the interstitial diffuser (e.g., with the diffuser overlapping the first display screen). The images may be captured by a camera (e.g., 210), where the camera may capture or record still images, video frames, frame-less video, etc. In one embodiment, more than one image may be captured for each of the positions of the interstitial diffuser (e.g., 240). Additionally, each image of the second set of images may depict or otherwise include data associated with a blur of the second visual output of the first display screen.

Step 370 involves determining respective Moiré interference values associated with the first visual output (e.g., from the first and second display screens) for each of the plurality of positions using the first set of images. The Moiré interference values for each diffuser location may be determined using images captured for each diffuser location. For example, a horizontal Moiré interference value determined from an image may indicate an amplitude or level of Moiré interference present in the image in a horizontal direction across the image, whereas a vertical Moiré interference value determined from the image may indicate an amplitude or level of Moiré interference present in the image in a vertical direction across the image. In one embodiment, Moiré interference values may be determined in step 370 in accordance with process 400 of FIGS. 4A and 4B.

Figure 4A:
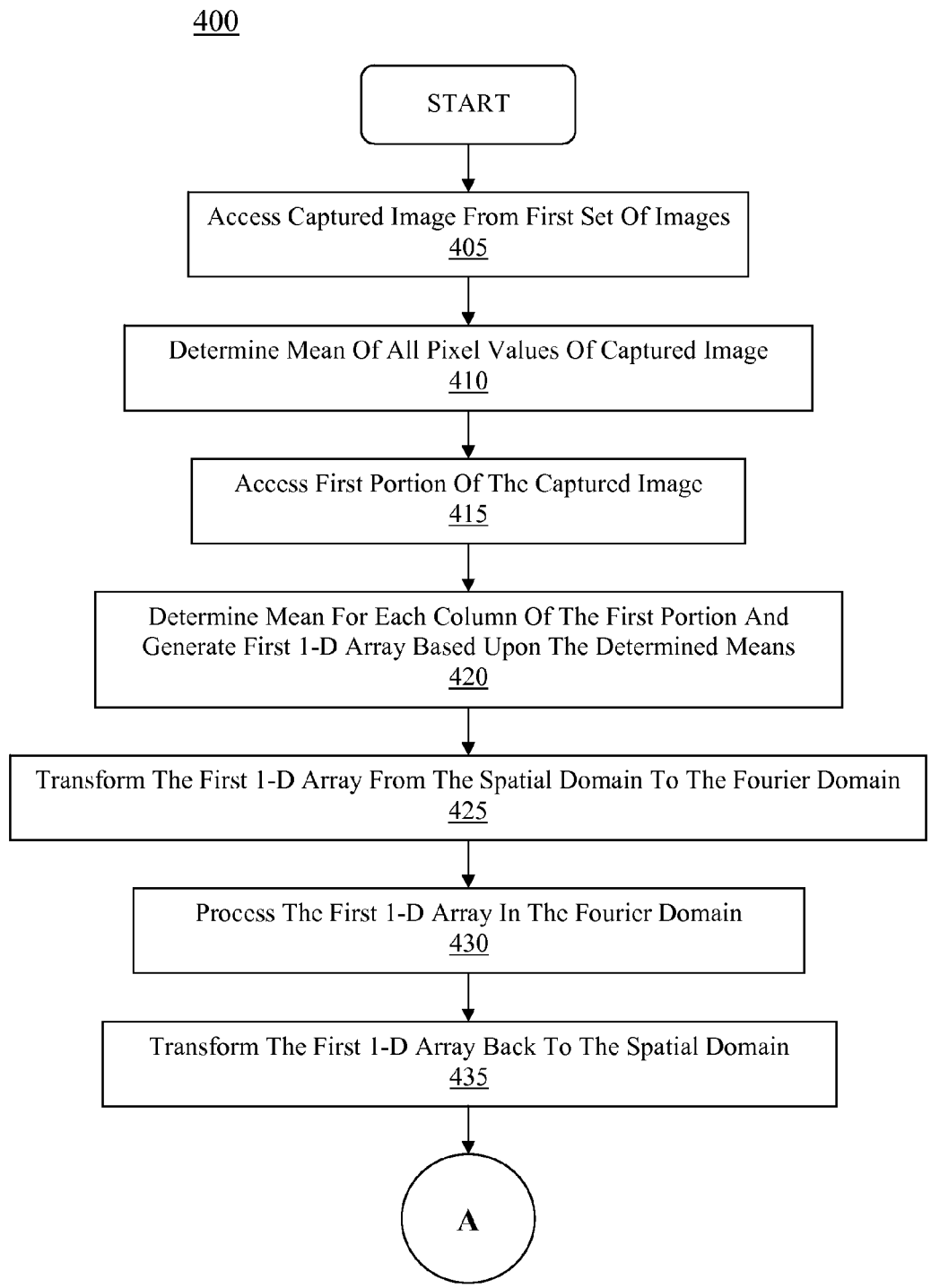
FIG. 4A shows a flowchart of a first portion of an exemplary computer-implemented process for determining Moiré interference values in accordance with one embodiment of the present invention.
Figure 4B:
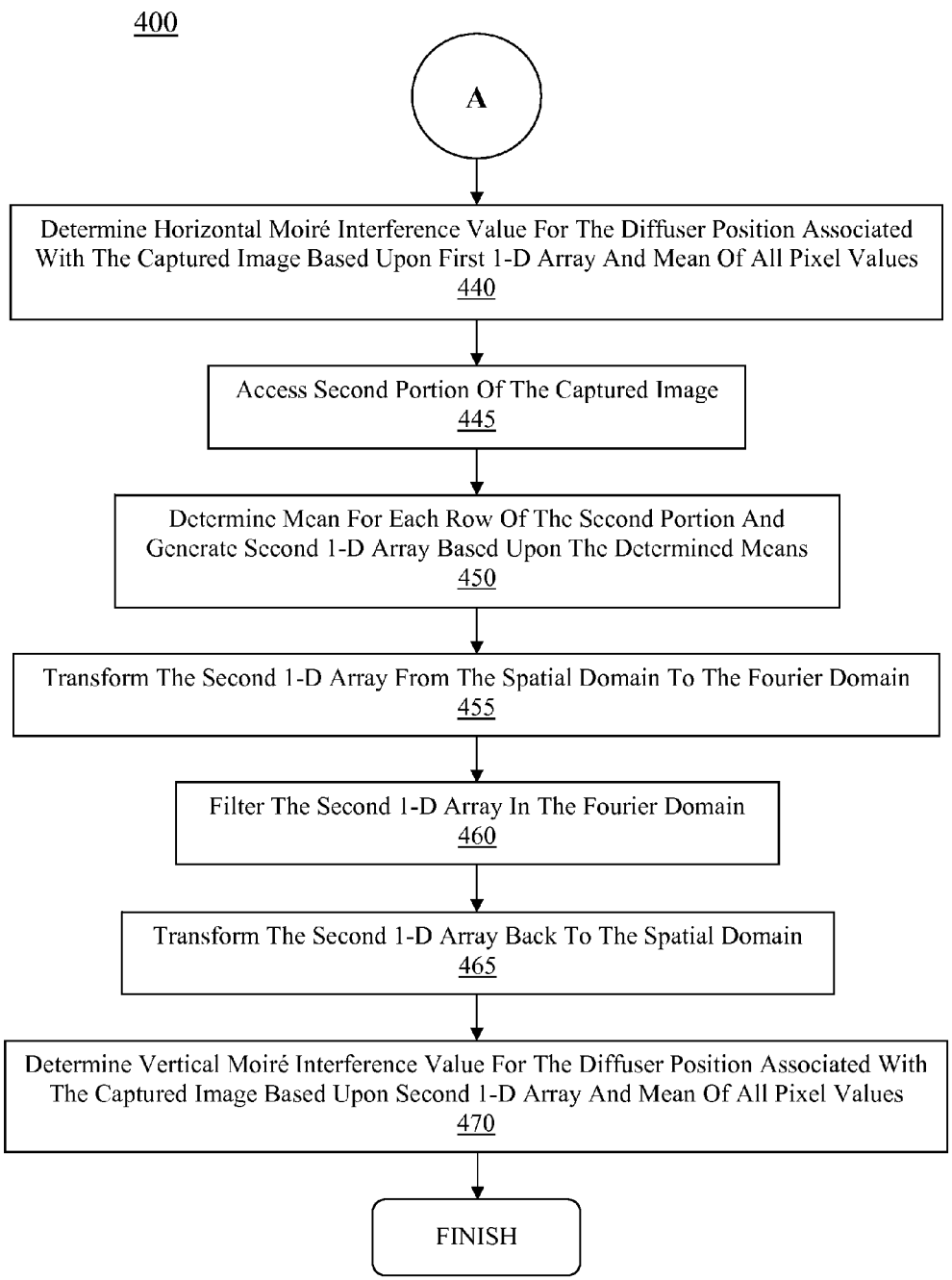
FIG. 4B shows a flowchart of a second portion of an exemplary computer-implemented process for determining Moiré interference values in accordance with one embodiment of the present invention.

FIGS. 4A and 4B show a flowchart of exemplary computer-implemented process 400 for determining Moiré interference values in accordance with one embodiment of the present invention. As shown in FIG. 4A, step 405 involves accessing a captured image from the first set of images (e.g., captured in step 330 of process 300). The captured image may include pixel data (e.g., color information for the pixel, depth information for the pixel, etc.) for each pixel of the image. The captured image accessed in step 405 may be an image of the visual output of a first display screen (e.g., 120) and a second display screen (e.g., 130) in one embodiment (e.g., as shown in FIG. 2A). Further, the captured image accessed in step 405 may depict or otherwise include data associated with a Moiré interference pattern in the visual output of the first and second display screens.

Step 410 involves determining a mean of all pixel values of the captured image. For example, the pixel data for all or a majority of the pixels of the image captured in step 405 may be averaged to determine a mean value for captured image. In one embodiment, the color or grayscale level of all pixels may be averaged in step 410 to determine a mean color or grayscale level for the captured image.

Figure 5:
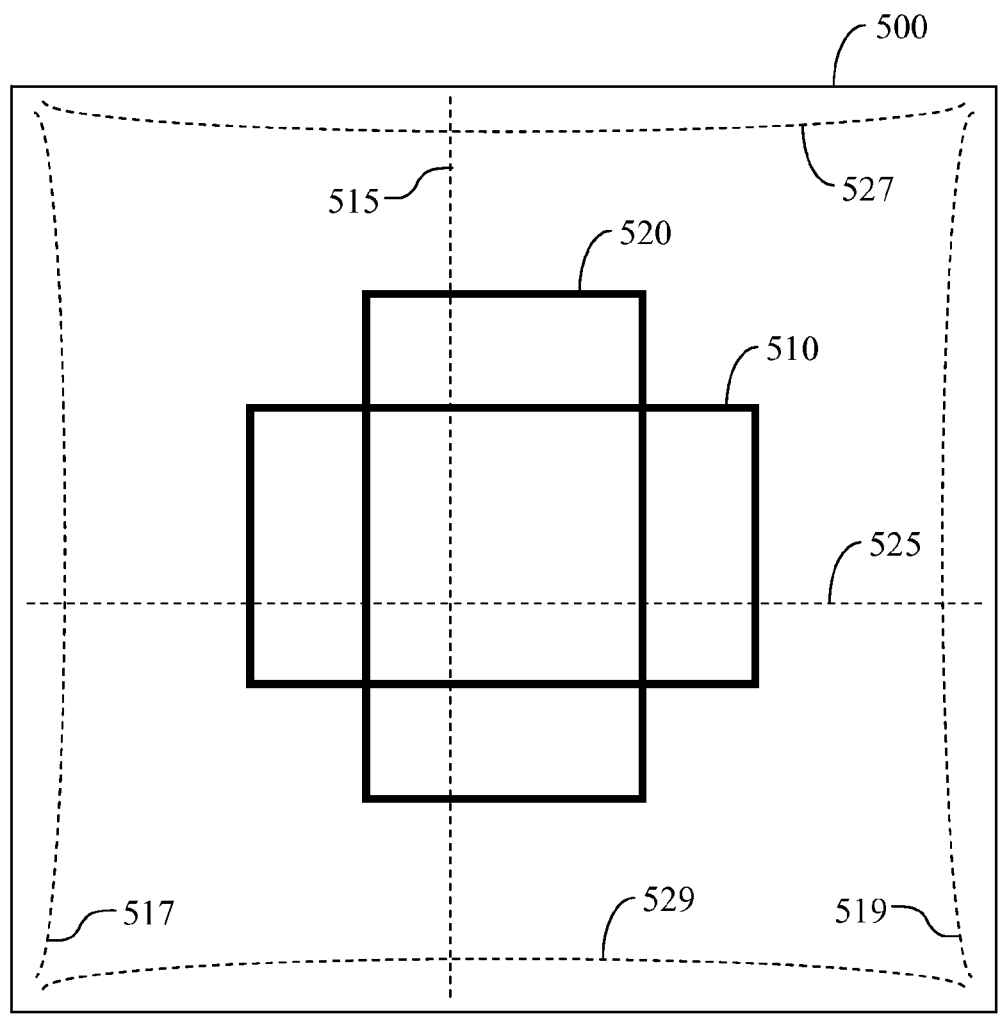
FIG. 5 shows a diagram of an exemplary image in accordance with one embodiment of the present invention.

Step 415 involves accessing a first portion of the captured image (e.g., accessed in step 405). The first portion may include a portion of the image toward the center of the image in one embodiment. For example, as shown in FIG. 5, portion 510 of image 500 may be accessed in step 415 in one embodiment. Portion 510 may include less image distortion (e.g., caused by fish-eye distortion or other parameters of the lens of the camera capturing the image) than surrounding areas of image 500 as shown by the relative straightness of line 515 with respect to lines 517 and 519 in areas of image 500 surrounding portion 510. In one embodiment, portion 510 may include approximately 500 rows and 500 columns of image data located toward the center of image 500. In other embodiments, the portion of the image accessed in step 415 may be of a different size and/or of a different area of the image.

Figure 6:
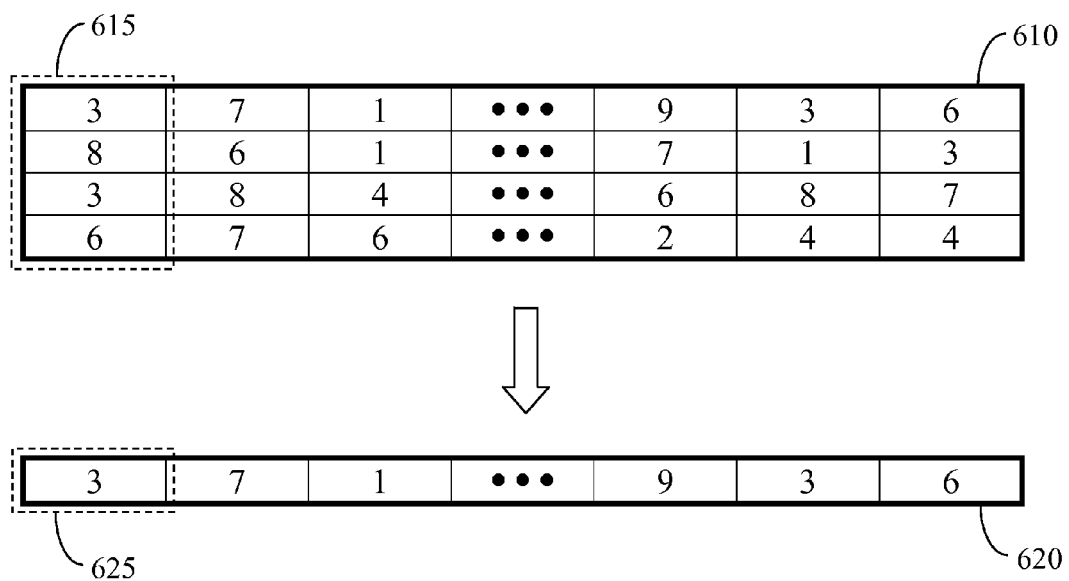
FIG. 6 shows a diagram of exemplary image data used to generate an exemplary one-dimensional array used to determine horizontal Moiré interference values in accordance with one embodiment of the present invention.

As shown in FIG. 4A, step 420 involves determining the mean for each column of the first portion and generating a first one-dimensional array based upon the determined means. For example, as shown in FIG. 6, exemplary image data 610 may be used to generate one-dimensional array 620. Each value of image data 610 may correspond to a pixel of the first portion of the image accessed in step 415. Additionally, each value of array 620 may be generated by taking the mean or average of the corresponding column of image data 610. For example, value 625 of array 620 may be determined by averaging the values in column 615 of image data 610. Similar calculations may be used to determine other values of array 620.

Although image data 610 is depicted with four rows in FIG. 6, it should be appreciated that image data 610 may include a larger or smaller number of rows in other embodiments. Additionally, although image data 610 is depicted with at least six columns in FIG. 6, it should be appreciated that image data 610 may include a larger or smaller number of columns in other embodiments.

Turning back to FIG. 4A, step 425 involves transforming the first one-dimensional array from the spatial domain to the Fourier domain. In one embodiment, each value of the array in the spatial domain (e.g., 620) corresponds to a different pixel from the first portion of the image (e.g., portion 510 of FIG. 5), where each value may represent a color or grayscale level of the respective pixel. In contrast, each value of the transformed array in the Fourier domain (e.g., generated in step 425) corresponds to a different frequency, where each value may represent a relative amplitude at the respective frequency determined based on a Fourier transform calculation of the array in the spatial domain (e.g., 620).

Step 430 involves processing the first one-dimensional array in the Fourier domain. In one embodiment, processing the array may remove signal components in the image due to characteristics of the camera lens (e.g., $\cos(\theta)^4$ fall off of the lens, etc.), characteristics of the MCD components (e.g., variations in the luminance of the display, arrangements of the pixel matrices of one or more of the display screens, etc.), or characteristics of other components of the system (e.g., 100, 200, etc.). For example, the processing in step 430 may involve bandpass filtering the one-dimensional array, thereby removing values from the array below a lower cutoff frequency and above an upper cutoff frequency. In one embodiment, values corresponding to frequencies below 5 Hz (e.g., the lower cutoff frequency) and above 40 Hz (e.g., the upper cutoff frequency) may be removed from the array. In other embodiments, other processing may be performed on the array in the Fourier domain.

It should be appreciated that "removal" of values from the array in step 430 may involve truncating the array, thereby resulting in a smaller array than that generated in step 420. Alternatively, the values to be "removed" from the array may instead be replaced with another value (e.g., a "0"), thereby reducing the effect of the values on future calculations or processing of the data within the array. In this case the array may remain the same size after processing in step 430. And in one embodiment, the array generated in step 430 may be larger than that generated in step 420 (e.g., by padding the array to increase its size).

As shown in FIG. 4A, step 435 involves transforming the first one-dimensional array back to the spatial domain. For example, an inverse Fourier transform calculation may be performed on the one-dimensional array to transform it from the Fourier domain to the spatial domain.

As shown in FIG. 4B, step 440 involves determining the horizontal Moiré interference value for the diffuser position associated with the captured image based upon the first one-dimensional array (e.g., generated in step 435) and the mean of all the pixel values (e.g., determined in step 410). For example, the values of the first one-dimensional array (e.g., generated in step 435) may be averaged, where the resulting value may be divided by the mean of all pixel values (e.g., generated in step 410). The result may then be multiplied by 100 to generate the horizontal Moiré interference value for the captured image.

It should be appreciated that steps 405 through 440 may be repeated for other captured images (e.g., corresponding to other diffuser positions) from the first set of images. In this manner, horizontal Moiré interference values may be generated for each diffuser position of the plurality of diffuser positions (e.g., at which the diffuser is positioned in step 310 of process 300).

As shown in FIG. 4B, step 445 involves accessing a second portion of the captured image (e.g., accessed in step 405). The second portion may include a portion of the image toward the center of the image in one embodiment. For example, as shown in FIG. 5, portion 520 of image 500 may be accessed in step 445 in one embodiment. Portion 520 may include less image distortion (e.g., caused by fish-eye distortion or other parameters of the lens of the camera capturing the image) than surrounding areas of image 500 as shown by the relative straightness of line 525 with respect to lines 527 and 529 in areas of image 500 surrounding portion 520. In one embodiment, portion 520 may include approximately 500 rows and 500 columns of image data located toward the center of image 500. In other embodiments, the portion of the image accessed in step 445 may be of a different size and/or of a different area of the image. And in one embodiment, the second portion of the image accessed in step 445 may include the same area of the image as the first portion of the image accessed in step 415.

Figure 7:
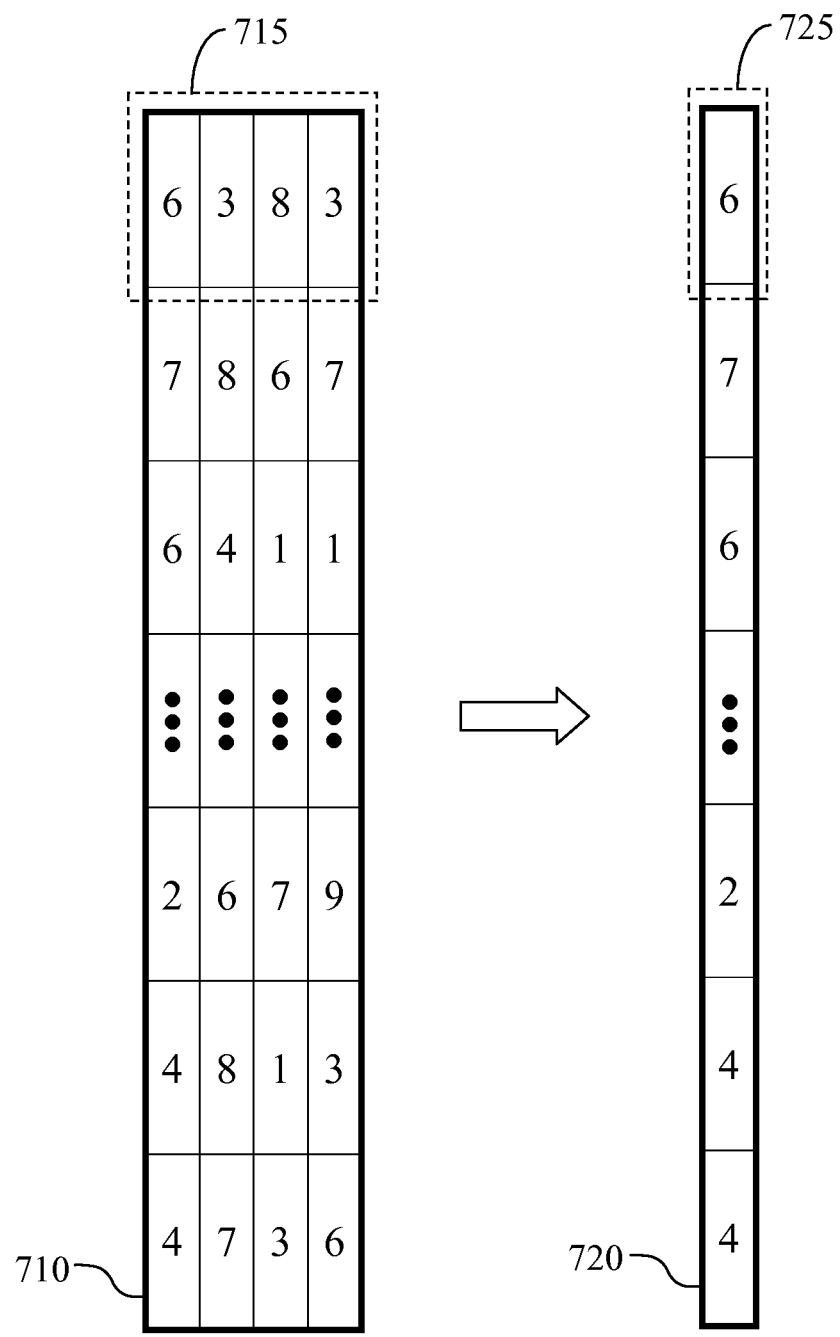
FIG. 7 shows a diagram of exemplary image data used to generate an exemplary one-dimensional array used to determine vertical Moiré interference values in accordance with one embodiment of the present invention.

Step 450 involves determining the mean for each row of the second portion and generating a second one-dimensional array based upon the determined means. For example, as shown in FIG. 7, exemplary image data 710 may be used to generate one-dimensional array 720. Each value of image data 710 may correspond to a pixel of the second portion of the image accessed in step 445. Additionally, each value of array 720 may be generated by taking the mean or average of the corresponding row of image data 710. For example, value 725 of array 720 may be determined by averaging the values in column 715 of image data 710. Similar calculations may be used to determine other values of array 720.

Although image data 710 is depicted with four columns in FIG. 7, it should be appreciated that image data 710 may include a larger or smaller number of columns in other embodiments. Additionally, although image data 710 is depicted with at least six rows in FIG. 7, it should be appreciated that image data 710 may include a larger or smaller number of rows in other embodiments.

Steps 455 through 465 may be performed analogously to steps 425 through 435 in one embodiment. However, it should be appreciated that steps 455 through 465 are performed with respect to the second one-dimensional array (e.g., generated in step 450) while steps 425 through 435 are performed with respect to the first one-dimensional array (e.g., generated in step 420).

As shown in FIG. 4B, step 470 involves determining the vertical Moiré interference value for the diffuser position associated with the captured image based upon the second one-dimensional array (e.g., generated in step 465) and the mean of all the pixel values (e.g., determined in step 410). For example, the values of the second one-dimensional array (e.g., generated in step 465) may be averaged, where the resulting value may be divided by the mean of all pixel values (e.g., generated in step 410). The result may then be multiplied by 100 to generate the vertical Moiré interference value for the captured image.

It should be appreciated that steps 445 through 470 may be repeated for other captured images (e.g., corresponding to other diffuser positions) from the first set of images. In this manner, vertical Moiré interference values may be generated for each diffuser position of the plurality of diffuser positions (e.g., at which the diffuser is positioned in step 310 of process 300).

Turning back to FIG. 3B, step 380 involves determining respective blur values associated with the first visual output (e.g., from the first and second display screens) for each of the plurality of positions using the first set of images. The blur values for each diffuser location may be determined using images captured for each diffuser location. For example, data from a captured image (e.g., with the diffuser overlapping the display screen as shown in FIG. 2A or 2B) may be compared to data from a reference image (e.g., captured with the diffuser removed from the field of view of the camera as shown in FIG. 2C). In one embodiment, blur values may be determined in step 380 in accordance with process 800 of FIGS. 8A and 8B.

Figure 8:
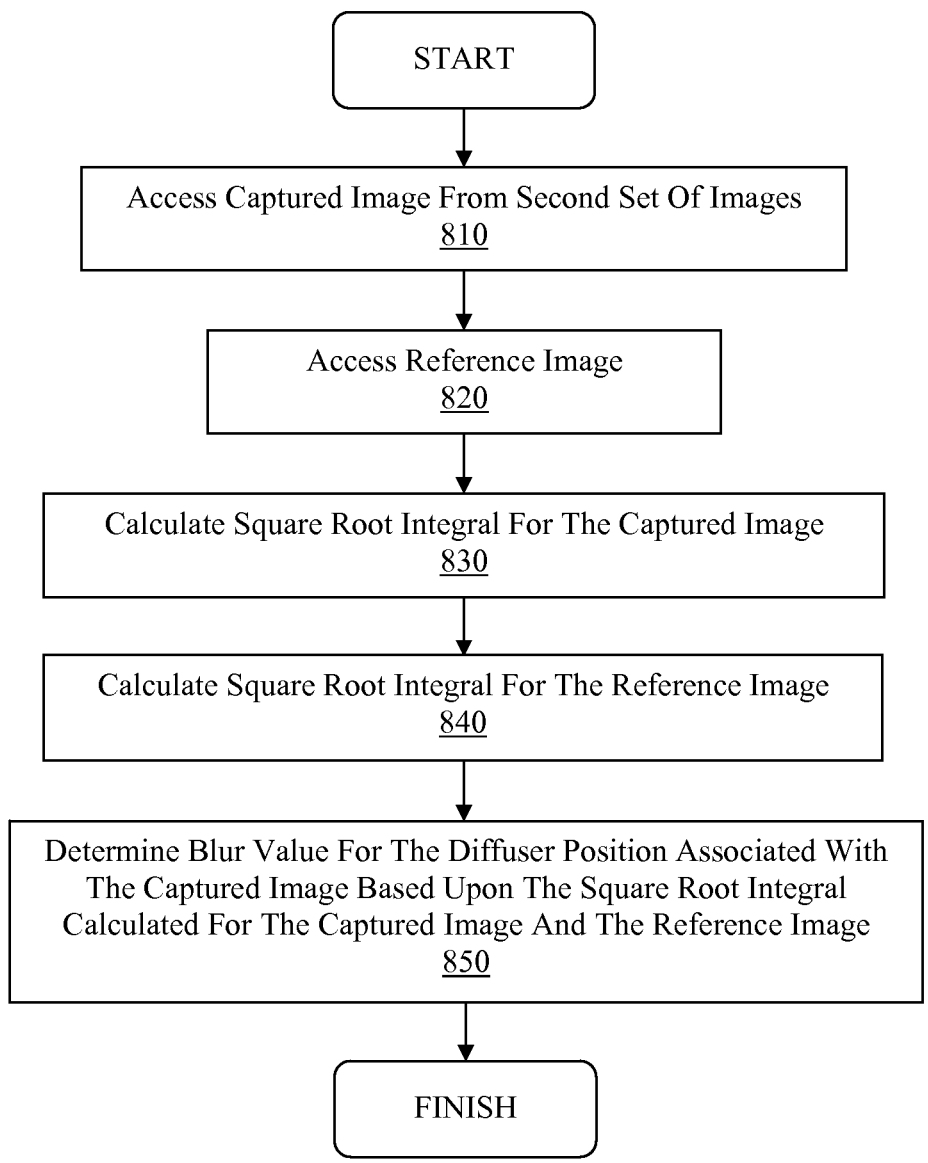
FIG. 8 shows a flowchart of an exemplary computer-implemented process for determining blur values in accordance with one embodiment of the present invention.

FIG. 8 shows a flowchart of exemplary computer-implemented process 800 for determining blur values in accordance with one embodiment of the present invention. As shown in FIG. 8, step 810 involves accessing a captured image from the second set of images (e.g., captured in step 360 of process 300). The captured image may include pixel data (e.g., color information for the pixel, depth information for the pixel, etc.) for each pixel of the image. The captured image accessed in step 810 may be an image of the visual output of a first display screen (e.g., 120) and a second display screen (e.g., 130) in one embodiment (e.g., as shown in FIG. 2A). Alternatively, the captured image accessed in step 810 may be an image of the visual output of a first display screen (e.g., 120) alone (e.g., with the second display screen removed from the field of view of the camera as shown in FIG. 2B).

Step 820 involves accessing a reference image. The reference image may be an image of visual output from a first display screen (e.g., 120) without a diffuser (e.g., 240) in the field of view of the camera (e.g., 210). Additionally, the first display screen may display the same image (e.g., 150) during capturing of the second set of images (e.g., from which one image is accessed in step 810) and the reference image (e.g., accessed in step 820). In this manner, the reference image may be similar to the captured image (e.g., accessed in step 810), however, the reference image may have no blur or less blur than the captured image (e.g., since the diffuser is in the field of view of the camera when taking the captured image but not in the field of view when taking the reference image) in one embodiment.

As shown in FIG. 8, step 830 involves calculating the square root integral for the captured image (e.g., accessed in step 810). In one embodiment, the square root integral for the captured image, "$J_d$," may be calculated in accordance with the following expression:

$$J_d = \frac{1}{\log(2)} \int_0^{u_{max}} \sqrt{CSF(u)MTF(u)} \left(\frac{du}{u}\right)$$

where the term "u" is the spatial frequency of the visual output of the MCD components (e.g., first display screen 120, second display screen 130, diffuser 240, some combination thereof, etc.). In one embodiment, "u" may be the inverse of the pixel pitch (e.g., the distance from the center of one pixel to the center of the next adjacent pixel) of the first display screen (e.g., 120). The function "CSF(u)" is the contrast sensitivity function with respect to the term "u." Additionally, the function "MTF(u)" is the modulation transfer function with respect to the term "u."

In one embodiment, the term "CSF(u)" may be calculated in accordance with the following expression:

$$CSF(u) = 5200 \times \exp\left[\frac{-0.0016 u^2 * \left(1 + \frac{100}{L}\right)^{0.08}}{\sqrt{1 + \frac{144}{x_0} + 0.64 u^2}} \frac{63}{L^{0.83}} + \frac{1}{1 - \exp(-0.02 u^2)}\right]$$

where the term "$x_0$" is the field size (e.g., the image size in pixels) of the captured image. The term "L" is the luminance associated with the visual output of the MCD components (e.g., first display screen 120, second display screen 130, diffuser 240, etc.). In one embodiment, a nominal value (e.g., 100 cd/m^2) for "L" may be used. Alternatively, "L" may be determined by measuring the luminance of the MCD components, for example, using a luminance meter capable of measuring the luminance associated with the visual output of the MCD components (e.g., placed near camera 210 of system 200). Alternatively, another expression may be used to calculate the term "CSF(u)."

The term "MTF(u)" may be calculated in accordance with the following expression:

$$MTF(u) = \left|\frac{(f_d \to F_d)}{(f_{r_r} \to F_r)}\right|$$

where the term "$f_d \to F_d$" represents a Fourier transform of the captured image (e.g., accessed in step 810). The term "$f_d \to F_d$" represents a Fourier transform of the reference image (e.g., accessed in step 820).

As shown in FIG. 8, step 840 involves calculating the square root integral for the reference image (e.g., accessed in step 820). The square root integral for the reference image, "$J_r$," may be calculated similarly to the square root integral for the captured image, "$J_d$." However, when calculating "$J_r$," a unity value (e.g., a matrix with all ones or substantially all ones) for the term "MTF(u)" may be used.

Step 850 involves determining a blur value for the diffuser position associated with the captured image based upon the square root integral calculated for the captured image and the reference image. In one embodiment, the blur value may be determined in step 850 in accordance with the following expression:

$$B = J_r - J_d$$

It should be appreciated that steps 810 through 850 may be repeated for other captured images (e.g., corresponding to other diffuser positions) from the second set of images. In this manner, blur values may be generated for each diffuser position of the plurality of diffuser positions (e.g., at which the diffuser is positioned in step 310 of process 300).

Turning back to FIG. 3B, step 390 involves selecting a position for the interstitial diffuser based upon the analysis of the respective Moiré interference values and the respective blur values. In one embodiment, the selected position for the diffuser (e.g., 240) may be associated with a Moiré interference value (e.g., horizontal and/or vertical) below a predetermined threshold. Additionally, in one embodiment, the selected position for the diffuser (e.g., 240) may be associated with the least amount of blur (e.g., as indicated by respective blur values) compared with the blur associated with other diffuser positions (e.g., those with Moiré interference values below the predetermined threshold or predetermined thresholds). In this manner, embodiments enable selection of a diffuser position with reduced Moiré interference and reduced blur.

Step 395 involves calibrating the test setup (e.g., including components of system 200) by comparing measured Moiré interference values (e.g., determined in accordance with step 370) with theoretical Moiré interference values. In one embodiment, theoretical horizontal Moiré interference values may calculated in accordance with the following expression:

$$M_H = 9 W_r W_f \left(\frac{1}{P_r P_f}\right) * \mathrm{sinc}(W_r x) * \sin$$

$$c\left[W_f\left(x - \left(\frac{1}{P_r}\right)\right)\right] * \exp\left[-\left(\pi^2\left(x - \left(\frac{1}{P_f}\right)\right)^2 2\sigma_L^2\right)\right]$$

where the term "$W_r$" is the pixel aperture width of the rear display screen (e.g., first display screen 120), "$W_f$" is effective pixel width of the front display screen (e.g., second display screen 130), "$P_r$" is the pixel pitch of the rear display screen (e.g., first display screen 120), and "$P_f$" is the pixel pitch of the front display screen (e.g., second display screen 130). The term "x" may be calculated in accordance with the following expression:

$$x = \left(\frac{1}{P_r}\right) - \left(\frac{1}{P_f}\right)$$

The term "$\Sigma_L$" may be calculated in accordance with the following expression:

$$\sigma_L = OD * \mathrm{atan}\left[\frac{\left(\frac{10\pi}{180}\right)}{2.3548}\right]$$

where the term "OD" is a vector representing a plurality of positions of the diffuser (e.g., 240). The positions represented by the term "OD" may correspond to the positions implemented during determination of the measured Moiré interference values (e.g., the positions at which the diffuser is placed in step 310). In this manner, the theoretical horizontal Moiré interference values may be compared to corresponding measured horizontal Moiré interference values (e.g., determined in accordance with step 370) in step 395.

Theoretical vertical Moiré interference values may be calculated in accordance with the following expression:

$$M_V = \frac{M_H}{9}$$

Accordingly, the theoretical vertical Moiré interference values may be compared to corresponding measured vertical Moiré interference values (e.g., determined in accordance with step 370) in step 395.

Figure 9:
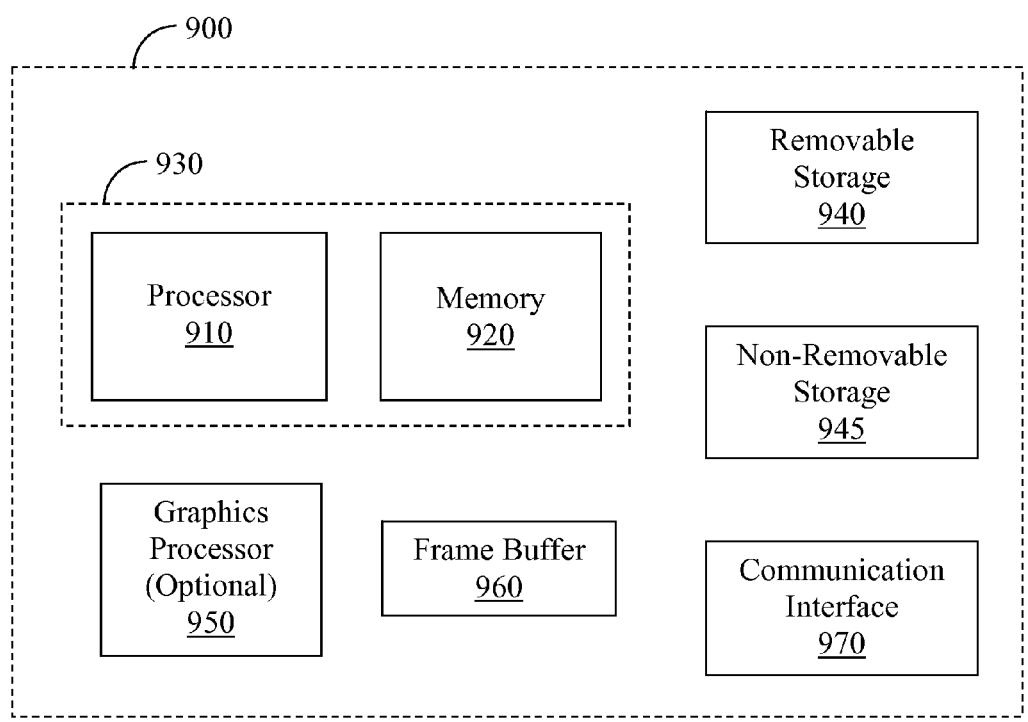
FIG. 9 shows an exemplary general purpose computer system platform upon which embodiments of the present invention may be implemented.

FIG. 9 shows exemplary general purpose computer system platform 900 upon which embodiments of the present invention may be implemented. For example, computer system 900 may be used to implement one or more components of computer system 220 (e.g., of FIGS. 2A, 2B and 2C) in one embodiment. As another example, computer system 900 may be used to implement diffuser position controller 283 (e.g., of FIGS. 2A, 2B and 2C) and/or display screen position controller 288 (e.g., of FIGS. 2A, 2B and 2C). As a further example, computer system 900 may communicate with MCD 100 in one embodiment.

As shown in FIG. 9, portions of the present invention are comprised of computer-readable and computer-executable instructions that reside, for example, in computer system platform 900 and which may be used as a part of a general purpose computer network (not shown). It is appreciated that computer system platform 900 of FIG. 9 is merely exemplary. As such, the present invention can operate within a number of different systems including, but not limited to, general-purpose computer systems, embedded computer systems, laptop computer systems, hand-held computer systems, portable computer systems, and stand-alone computer systems, for instance.

In one embodiment, depicted by dashed lines 930, computer system platform 900 may comprise at least one processor 910 and at least one memory 920. Processor 910 may comprise a central processing unit (CPU) or other type of processor. Depending on the configuration and/or type of computer system environment, memory 920 may comprise volatile memory (e.g., RAM), non-volatile memory (e.g., ROM, flash memory, etc.), or some combination of the two. Additionally, memory 920 may be removable, non-removable, etc.

In other embodiments, computer system platform 900 may comprise additional storage (e.g., removable storage 940, non-removable storage 945, etc.). Removable storage 940 and/or non-removable storage 945 may comprise volatile memory, non-volatile memory, or any combination thereof. Additionally, removable storage 940 and/or non-removable storage 945 may comprise CD-ROM, digital versatile disks (DVD) or other optical storage, magnetic cassettes, magnetic tape, magnetic disk storage or other magnetic storage devices, or any other medium which can be used to store information for access by computer system platform 900.

As shown in FIG. 9, computer system platform 900 may communicate with other systems, components, or devices via communication interface 970. Communication interface 970 may embody computer readable instructions, data structures, program modules or other data in a modulated data signal (e.g., a carrier wave) or other transport mechanism. By way of example, and not limitation, communication interface 970 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 970 may also couple computer system platform 900 to one or more input devices (e.g., a keyboard, mouse, pen, voice input device, touch input device, etc.). Additionally, communication interface 970 may couple computer system platform 900 to one or more output devices (e.g., a display, speaker, printer, etc.).

As shown in FIG. 9, optional graphics processor 950 may perform graphics processing operations on graphical data stored in frame buffer 960 or another memory (e.g., 920, 940, 945, etc.) of computer system platform 900. Graphical data stored in frame buffer 960 may be accessed, processed, and/or modified by components (e.g., graphics processor 950, processor 910, etc.) of computer system platform 900 and/or components of other systems/devices. Additionally, the graphical data may be accessed (e.g., by graphics processor 950) and displayed on an output device coupled to computer system platform 900. Accordingly, memory 920, removable storage 940, non-removable storage 945, fame buffer 960, or a combination thereof, may comprise instructions that when executed on a processor (e.g., 910, 950, etc.) implement a process for determining a position of an interstitial diffuser (e.g., 140, 240, etc.) for a multi-component display (e.g., 100).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of determining a position for an interstitial diffuser for a multi-component display, said method comprising:
    positioning said interstitial diffuser at a plurality of positions between a first display screen and a second display screen, wherein said second display screen overlaps said first display screen;
    capturing images of visual output from said first display screen and said second display screen at each of said plurality of positions;
    determining, based on said images, a respective visual interference value and a respective blur value associated with said visual output at each of said plurality of positions of said interstitial diffuser;
    selecting a position from said plurality of positions based on a visual interference value and a blur value associated therewith; and
    displaying white images on said first and second display screens;
    wherein said capturing images of said visual output further comprises capturing images of a Moire interference pattern caused by display of said white images on said first and second display screens; and wherein said determining a visual interference value further comprises determining a Moire interference value based on said images of said Moire interference patterns captured.

2. The method of claim 1, wherein said capturing images further comprises capturing a respective still image at each of said plurality of positions of said interstitial diffuser using a camera.

3. The method of claim 1, wherein said capturing images further comprises recording a video of said visual output using a camera, and wherein said positioning said interstitial diffuser further comprises moving said interstitial diffuser through said plurality of positions during said recording said video.

4. The method of claim 1 further comprising:
transforming image data of said images from said spatial domain to a Fourier domain to generate transformed image data; and
filtering said transformed image data in said Fourier domain.

5. The method of claim 1 further comprising:
removing said interstitial diffuser and said second display screen from a field of view of a camera;
capturing a reference image of visual output from said first display screen with said interstitial diffuser and said second displays screen removed from said field of view; and
wherein said determining said blur value further comprises generating said blur value based on comparison of said images with said reference image.

6. The method of claim 5, wherein said visual output from said first display screen is selected from: a random image; a pattern; and a graphical object with at least one straight edge.

7. A system comprising:
means for positioning said interstitial diffuser at a plurality of positions between a first display screen and a second display screen, wherein said second display screen overlaps said first display screen;
means for capturing images of visual output from said first display screen and said second display screen, using a camera, at each of said plurality of positions;
means for determining, based on said images, a respective Moire interference value and a respective blur value associated with said visual output at each of said plurality of positions of said interstitial diffuser;
means for selecting a position from said plurality of positions based on a Moire interference value and a blur value associated with said position; and
means for controlling display of white images on said first and second display screens;
wherein said means for capturing images of said visual output is further operable to capture images of Moire interference patterns caused by display of said white images on said first and second display screens; and
wherein said means for determining a Moire interference value is further operable to determine a Moire interference value based on said images of said Moire interference patterns captured using said camera.

8. The system of claim 7, wherein said means for capturing images of said visual output is further operable to capture a respective still image at each of said plurality of positions of said interstitial diffuser.

9. The system of claim 7, wherein said means for capturing images of said visual output is operable to perform a video recording of said visual output using said camera, and wherein said means for positioning said interstitial diffuser is further operable to move said interstitial diffuser through said plurality of positions during said video recording.

10. The system of claim 7 further comprising:
means for transforming image data of said images from said spatial domain to a Fourier domain to generate transformed image data; and
means for filtering said transformed image data in said Fourier domain.

11. The system of claim 8 further comprising:
means for removing said interstitial diffuser and said second display screen from a field of view of said camera;
means for capturing a reference image of visual output from said first display screen with said interstitial diffuser and said second displays screen removed from said field of view; and
wherein said means for determining said blur value is further operable to generate said blur value based on comparison of said images with said reference image.

12. The system of claim 11, wherein said visual output from said first display screen is selected from: a random image; a pattern; and a graphical object with at least one straight edge.

13. A system comprising:
a first display screen comprising a plurality of pixels, said first display screen operable to display a first image;
a second display screen comprising a second plurality of pixels, said second display screen operable to display a second image, wherein said second display screen overlaps said first display screen;
a diffuser operable to be positioned at a plurality of positions between said first and second display screens;
a device operable to capture images of visual output of said first and second display screens;
a computer system coupled to said device and for determining, based on said images, a respective visual interference value and a respective blur value associated with said visual output at each of said plurality of positions of said interstitial diffuser, said computer system further for selecting a position from said plurality of positions based on a visual interference value and a blur value associated with said position wherein said first and second display screens are further operable to display white images, wherein said device is further operable to capture images of Moire interference patterns caused by display of said white images on said first and second display screens, and wherein said computer system is further operable to determine said Moire interference value based on images of said Moire interference patterns captured using said device.

14. The system of claim 13, wherein said device is further operable to capture a respective image at each of said plurality of positions of said interstitial diffuser.

15. The system of claim 13, wherein said device is further operable to record a video of said visual output, and wherein said interstitial diffuser is further operable to be moved through said plurality of positions during recording of said video.

16. The system of claim 13, wherein said device is further operable to capture a reference image of visual output from said first display screen with said interstitial diffuser and said second displays screen removed from a field of view of said device, and wherein said computer system is further operable to generate said blur value based on comparison of said images with said reference image.

17. The system of claim 16, wherein said visual output from said first display screen is selected from: a random image; a pattern; and a graphical object with at least one straight edge.

18. A method of determining a position for an interstitial diffuser for a multi-component display, said method comprising:
positioning said interstitial diffuser at a plurality of positions between a first display screen and a second display screen, wherein said second display screen overlaps said first display screen;
capturing images of visual output from said first display screen and said second display screen at each of said plurality of positions;

determining, based on said images, a respective visual interference value and a respective blur value associated with said visual output at each of said plurality of positions of said interstitial diffuser;

selecting a position from said plurality of positions based on a visual interference value and a blur value associated therewith;

removing said interstitial diffuser and said second display screen from a field of view of a camera;

capturing a reference image of visual output from said first display screen with said interstitial diffuser and said second displays screen removed from said field of view; and wherein said determining said blur value further comprises generating said blur value based on comparison of said images with said reference image.

19. A system comprising:

means for positioning said interstitial diffuser at a plurality of positions between a first display screen and a second display screen, wherein said second display screen overlaps said first display screen;

means for capturing images of visual output from said first display screen and said second display screen, using a camera, at each of said plurality of positions;

means for determining, based on said images, a respective Moire interference value and a respective blur value associated with said visual output at each of said plurality of positions of said interstitial diffuser;

wherein said means for capturing images of said visual output is further operable to capture a respective still image at each of said plurality of positions of said interstitial diffuser;

means for selecting a position from said plurality of positions based on a Moire interference value and a blur value associated with said position;

means for removing said interstitial diffuser and said second display screen from a field of view of said camera; and means for capturing a reference image of visual output from said first display screen with said interstitial diffuser and said second displays screen removed from said field of view; and wherein said means for determining said blur value is further operable to generate said blur value based on comparison of said images with said reference image.

20. A system comprising:

a first display screen comprising a plurality of pixels, said first display screen operable to display a first image;

a second display screen comprising a second plurality of pixels, said second display screen operable to display a second image, wherein said second display screen overlaps said first display screen;

a diffuser operable to be positioned at a plurality of positions between said first and second display screens;

a device operable to capture images of visual output of said first and second display screens;

a computer system coupled to said device and for determining, based on said images, a respective visual interference value and a respective blur value associated with said visual output at each of said plurality of positions of said interstitial diffuser, said computer system further for selecting a position from said plurality of positions based on a visual interference value and a blur value associated with said position; wherein said device is further operable to capture a reference image of visual output from said first display screen with said interstitial diffuser and said second displays screen removed from a field of view of said device, and wherein said computer system is further operable to generate said blur value based on comparison of said images with said reference image.

* * * * *